(12) United States Patent
Abhyankar et al.

(10) Patent No.: US 7,899,832 B2
(45) Date of Patent: Mar. 1, 2011

(54) APPARATUS AND METHOD FOR ASSESSING RELEVANT CATEGORIES AND MEASURES FOR USE IN DATA ANALYSES

(75) Inventors: Saurabh Abhyankar, Hauts de Seine (FR); Jean-Luc Agathos, Paris (FR); Virgile Chongvilay, Boissy Saint Leger (FR); Davor Cubranic, Vancouver (CA); Julian Lars Gosper, Vancouver (CA)

(73) Assignee: Business Objects Software Ltd., Dublin (IE)

(*) Notice: Subject to any disclaimer, the term of this patent is extended or adjusted under 35 U.S.C. 154(b) by 362 days.

(21) Appl. No.: 11/871,949

(22) Filed: Oct. 12, 2007

(65) Prior Publication Data

US 2008/0104060 A1 May 1, 2008

Related U.S. Application Data

(63) Continuation-in-part of application No. 11/555,206, filed on Oct. 31, 2006.

(51) Int. Cl.
*G06F 17/30* (2006.01)
(52) U.S. Cl. .................... 707/752; 707/957; 707/999.101
(58) Field of Classification Search .................. 707/1, 3, 707/6, 10, 100, 101, 738, 752, 957, 999.003, 707/999.006, 999.007, 999.101; 709/217; 715/273
See application file for complete search history.

(56) References Cited

U.S. PATENT DOCUMENTS

| | | | |
|---|---|---|---|
| 4,725,658 A | 2/1988 | Thayer et al. | |
| 6,101,493 A * | 8/2000 | Marshall et al. | 1/1 |
| 6,348,932 B1 | 2/2002 | Nishikawa et al. | |
| 6,963,867 B2 * | 11/2005 | Ford et al. | 707/752 |
| 6,984,390 B2 | 1/2006 | Sakuta | |
| 7,461,051 B2 * | 12/2008 | Lavine | 1/1 |

(Continued)

FOREIGN PATENT DOCUMENTS

EP 07863617.2 7/2010

(Continued)

OTHER PUBLICATIONS

Christian Borgelt, 2005, "An Implementation or the FP-Growth Algorithm", *OSDM '05: Proceedings of the 1st international workshop on open source data mining*, ACM Press, Chicago, 1-59593-210-0, available at http:/fuzzy.cs.uni-magdeburg.de/~borgelt/papers/fpgrowth.pdf.

(Continued)

*Primary Examiner* — Marc R Filipczyk
(74) *Attorney, Agent, or Firm* — Cooley LLP

(57) ABSTRACT

A computer readable storage medium includes executable instructions to receive a relevancy parameter. The relevancy parameter is searched in a category ensemble including a set of categories, where the category ensemble overlies a dataset. A first order of the set of categories is created based on the relevancy of the relevancy parameter to each category in the set of categories, where the relevancy is a degree of match to the relevancy parameter. A second order of the set of categories is created based on the merit of each category to partition the dataset. The first order and the second order are combined into a final order, which is returned. A measure in the category ensemble is searched based on the relevancy parameter. The measure is returned as a selected measure, where the selected measure is a codomain of a visualization depicting a portion of the dataset.

13 Claims, 16 Drawing Sheets

U.S. PATENT DOCUMENTS

| | | | |
|---|---|---|---|
| 7,689,666 | B2* | 3/2010 | Commons .................... 709/217 |
| 7,734,576 | B2 | 6/2010 | Simon et al. |
| 2001/0049677 | A1 | 12/2001 | Talib et al. |
| 2002/0038299 | A1* | 3/2002 | Zernik et al. ...................... 707/3 |
| 2005/0049992 | A1 | 3/2005 | Gupta |
| 2006/0053389 | A1 | 3/2006 | Michelman |
| 2006/0161867 | A1 | 7/2006 | Drucker et al. |
| 2006/0218503 | A1 | 9/2006 | Matthews et al. |
| 2007/0179967 | A1* | 8/2007 | Zhang .......................... 707/102 |

FOREIGN PATENT DOCUMENTS

| | | |
|---|---|---|
| WO | WO 99/62006 | 12/1999 |
| WO | WO 02/44942 A1 | 6/2002 |
| WO | WO 2006/37613 A2 | 4/2006 |
| WO | PCT/US07/82870 | 9/2008 |

OTHER PUBLICATIONS

Christian Kohlschutter, Paul-Alexandru Chirita and Wolfgang Nejdl, 2006, "Using Link Analysis to Identify Aspects in Faceted Web Search", available at http://www.l3s.de/~kohlschuetter/publications/kohlschuetter-sigir06-facetedws.pdf.

Daniel Tunkelang, 2006, "Dynamic Category Sets: An Approach for Faceted Search", available at http://www.cs.cmu.edu/~quixote/DynamicCategorySets.pdf.

Gert Schmeltz Pedersen, 1993, "A Browser for Bibliographic Information Retrieval, Based on an Application of Lattice Theory", *SIGIR '93: Proceedings of the 16th Annual International ACM SIGIR Conference on Research and Development in Information Retrieval*, ACM Press, New York, 0-89791-605-0.

Giovanni M. Sacco, 2000, "Dynamic Taxonomies: A Model for Large Information Bases", *IEEE Transactions on Knowledge and Data Engineering*, 12, No. 3, pp. 468-479.

Jiawei Han, Jian Pei and Yiwen Yin, 2000, "Mining Frequent Patterns without Candidate Generation", *2000 ACM SIGMOD Intl. Conference on Management of Data*, ACM Press, 1-58113-218-2.

Jaiwei Han, Jian Pei, Yiwen Yin and Runying Mao, 2004, "Mining Frequent Patterns without Candidate Generation: A Frequent-Pattern Tree Approach", *Data Mining and Knowledge Discovery*, 8, pp. 53-87.

Jukka Perkio, Ville Tuulos, Wray Buntine and Henry Tirri, 2005, "Multi-Faceted Information Retrieval System for Large Scale Email Archives", *WI '05: Proceedings of the 2005 IEEE/WIC/ACM International Conference on Web Intelligence (WI '05)*, IEEE Computer Society, Washington, 0-7695-2415-X, available at http://cosco.hiit.fi/Articles/wi05-mail.pdf.

Marti A. Hearst, 2006, "Clustering versus Faceted Categories for Information Exploration", *Communications of the ACM*, 49, No. 4, pp. 59-61, available at http://flamenco.berkeley.edu/papers/cacm06.pdf.

Siderean Software, Inc., 2005, "It's Time for Computers to Allow You to Find Information 'the Way You Think', Says Siderean Founder", available at http://www.siderean.com/newsitem.aspx?pid=12.

Travis Wilson, 2006, "The Strict Faceted Classification Model", available at http://www.facetmap.com/pub/strict_faceted_classification.pdf.

William Denton, 2003, "Putting Facets on the Web: An Annotated Bibliography", available at http://www.miskatonic.org/library/facet-biblio.html.

Wisam Dakka, Panagiotis G. Ipeirotis and Kenneth R. Wood, 2005, "Automatic Construction of Multifacted Browsing Interfaces", *CIKM '05: Proceedings of the 14th ACM international conference on Information and knowledge management*, ACM Press, Bremen, 1-59593-140-6, available at http://pages.stern.nyu.edu/~panos/publications/cikm2005.pdf.

Business Objects S.A., EP 07863616. Supplementary European Search Report (Mar. 8, 2010).

Greene et al., "The End of Zero-hit Queries: Query Previews for NASA's Global Change Master Directory", Int J Digit Libr (1999) 2:79-90.

Yang et al., "A Comparative Study on Feature Selection in Text Categorization", Machine Learning, Proc of the Intl Conf (Jul. 8, 1997) 9 pages.

Business Objects S.A., PCT/US2007/20829, Int'l Search report (Mar. 10, 2008).

Business Objects S.A., PCTUS2007/082871, Intl Search Report/Written Opinion (Jul. 16, 2008).

Ahlberg et al. "Visual information seeking: tight coupling of dynamic query filters with starfield displays", Proc. ACM Conference on Human Factors in Software, CHI '94, Boston, Apr. 1994, ACM Press, pp. 313-317 (1994).

Elliott, "Flamenco Image Browser: Using Metadata to Improve Image Search During Architectural Design." Extended Abstracts on Human Factors in Computing Systems, CH. 1, 2 pgs. (Mar. 31 — Apr. 5, 2001).

Gile, "In search of the ubiquitous analytic end user: Profiling the analytic end user" DM Review (Sep. 2003).

Hearst, "Design Recommendations for Hierarchical Faceted Search Interfaces", ACM SIGIR Workshop on Faceted Search, SIGIR '06 Workshop on Faceted Search, Seattle, WA (Aug. 10, 2006) (http://flamenco.berkeley.edu/papers/faceted-workshop06.pdf).

Hearst et al., "Finding the Flow in Web Site Search", Communications of the ACM, 45(9):42-49 (2002).

Hearst "Next Generation Web Search: Setting Our Sites", IEEE Data Engineering Bulletin, 23:38-48 (2000).

Hostetter, "Faceted Searching with Apache Solr", (web doc. created Oct. 13, 2006).

Kules et al., "Designing a Metadata-driven Visual Information Browser for Federal Statistics", Proceedings of the 2003 Annual Nat'l Conf on Digital Government Research (May 18 - 21, 2003).

Oren et al., "A Prototype for Faceted Browsing of RDF Data", Proceedings of Scripting for the Semantic Web Workshop at the ESWC, Budva, Montenegro (Jun. 12, 2006).

Priss,"A Graphical Interface for Conceptually Navigating Faceted Thesauri", Proceedings of the Fifth Intern'l ISKO Conf., Lille, France (1998).

Ross et al., "A Faceted Query Engine Applied to Archaeology", Proceedings of the 31st Intern'l Conf. on Very Large Data Bases (Aug. 30-Sep. 2, 2005).

Schraefel et al., 2006 "mSpace: Improving Information Access to Multimedia Domains with Multimodal Exploratory exploratory search" (Apr. 19, 2006).

Stephens et al., "Aggregation of Bioinformatics Data Using Semantic Web Technology", Web Semantics: Science, Services and Agents on the World Wide Web, 4(3):216-221 (2006) (http://citeseerx.ist.psu.edu/viewdoc/download?doi=10.1.1.108.5408&rep=rep1&type=pdf.

Stoica et al., "Demonstration: Using WordNet to Build Hierarchical Facet Categories" SIGIR'06 Workshop on Faceted Search (Aug. 10, 2006).

Yee et al. "Faceted metadata for image search and browsing" Proc. of Conference on Human Factors in Computing Systems 2003 (Apr. 5-10, 2003).

Yee et al., "Flamenco Software Release 1.0", Updated Apr. 23, 2006.

* cited by examiner

FIG. 13

[Explore] — 1302
[sales revenue t-shirt] — 1304
[Search] — 1306

▲ ▣ 100 Information Spaces available ▼

▲ Accounting — 1310-1
Please use this information space to explore company financial activity and examine various aspects of expenses across various departments...
Indexed on: 23/04/2007
○Expenses ○Budget □Year □Division □Role □State □City  8 more... — 1314-1  } 1312-1       1308-1

▲ Corporate — 1310-2
Is information space to examine company strategic planning - what ifs?; projected sales; strategic opportunities...
Indexed on: 18/11/2006
○Projected Revenue □Quarter □Year □Region □Category □Product  3 more... — 1314-2  } 1312-2       1308-2

▲ Channels — 1310-3
All relevent data regarding channels - products by various regions, customers, and markets including returns and units sold...
Indexed on: 02/07/2007
○Units sold □Returns □Quarter □Year □Region □Category □Product  } 1312-3       1308-3

▲ Department & employees — 1310-4
Corporate-wide historical analysis of department headcount.
Indexed on: 18/11/2006
○Headcount □Department □Role □Year — 1314-4  } 1312-4       1308-4

▲ Distribution — 1310-5
All relevent data regarding distribution of products to various regions, customers, and markets including returns and units sold...
Indexed on: 02/07/2007                                                                                       } 1312-5       1308-5

Page [1] of 1

FIG. 15

APPARATUS AND METHOD FOR ASSESSING RELEVANT CATEGORIES AND MEASURES FOR USE IN DATA ANALYSES

CROSS REFERENCE TO RELATED APPLICATIONS

This application is a continuation-in-part of pending U.S. Ser. No. 11/555,206, filed Oct. 31, 2006, entitled "Apparatus and Method for Categorical Filtering of Data", the contents of which are incorporated by reference.

BRIEF DESCRIPTION OF THE INVENTION

This invention relates generally to filtering data. More particularly, this invention relates to determining filtering categories that will filter data efficiently.

BACKGROUND OF THE INVENTION

Large datasets with large numbers of associated categories are difficult to navigate quickly. In some cases, filtering on certain categories will only eliminate one or two records from the dataset. Prior art techniques generally provide a list of categories and attributes to filter on without indicating or determining how the filters will affect the resulting dataset. In many cases, the prior art provides a pre-determined hierarchy of categories to which records are indexed.

In view of the foregoing, it would be highly desirable to provide enhanced techniques for determining which categories will filter data efficiently.

Many users have difficulty analyzing datasets. While some users are of various components in a dataset, they commonly do not have the tools or skills to locate the components. Performing an analysis includes the selection of components, such as categories (also known as dimensions), measures and the like. Efficient navigation of a dataset often relies on a user's knowledge of the structure of the dataset. Knowledge of the dataset's structure fosters selection of filters to partition the dataset and select measures. This knowledge and corresponding analysis skills are outside the skill set of a vast number of computer users.

In view of the foregoing it would be desirable to provide enhanced techniques for navigating datasets. It would be highly desirable to provide enhanced techniques for selecting measures, selecting categories and applying filters as part of performing analyses on a dataset.

SUMMARY OF INVENTION

The invention includes a computer readable storage medium with executable instructions to receive a selection of a category ensemble overlying a dataset. An analysis view of the category ensemble is defined. The analysis view comprises a set of categories divided into a first subset of unselected categories and a second subset of selected categories. The analysis view also includes a set of measures and a visualization for a subset of the dataset. A first order of the first subset of unselected categories is created based on relevancy. A second order of the first subset of unselected categories is created based on merit, where merit is a value which indicates efficiency for partitioning the dataset. The first order and the second order are combined into a final order for the first subset of unselected categories of the set of categories. The first subset of unselected categories is displayed in the final order.

The invention includes a computer readable storage medium with executable instructions to receive a relevancy parameter. The relevancy parameter is searched in a category ensemble including a set of categories where the category ensemble overlies a dataset. A first order of the set of categories is created based on the relevancy of the relevancy parameter to each category in the set of categories, where the relevancy is a degree of match to the relevancy parameter. A second order of the set of categories is created based on the merit of each category to partition the dataset. The first order and the second order are combined into a final order, which is returned. A measure in the category ensemble is searched based on the relevancy parameter. The measure is returned as a selected measure, where the selected measure is a codomain of a visualization depicting a portion of the dataset.

BRIEF DESCRIPTION OF THE FIGURES

The invention is more fully appreciated in connection with the following detailed description taken in conjunction with the accompanying drawings, in which:

FIG. 13 illustrates a Graphical User Interface (GUI) for accepting a relevancy parameter in accordance with a specific embodiment of the invention.

FIG. 15 illustrates the GUI of FIG. 13 displaying an additional tab showing an analysis view of a category ensemble in accordance with categories ordered by relevancy and merit in accordance with an embodiment of the invention.

Like reference numerals refer to corresponding parts throughout the several views of the drawings.

DETAILED DESCRIPTION OF THE INVENTION

The following terminology is used while disclosing embodiments of the invention:

An attribute is any non-null value in a dataset when calculating merit and any value in the dataset for relevancy calculations.

An attribute combination is a set or subset of attributes associated with a particular record in a dataset.

An attribute count is the number of times that a distinct attribute appears in a single category.

An attribute count data structure is a data structure (e.g., a temporary reference table, a list, a hash table, or a tree) that stores the attribute counts for all attributes in a dataset. This data structure is an optional component of the categorical filtering process described within.

A category comprises a group of correlated attributes. A category may be defined by similar locations of attributes in a data source. For example, a category is a column in a database table or spreadsheet, a set of fields sharing the same tag in an XML file, or a set of fields with a shared relative location within a hierarchical data source. A category is a group of attributes which collectively define a group in a classification scheme. A category may be a dimension from a semantic abstraction or multidimensional data source. These dimensions can be hierarchical or not.

Common leading attributes are the set of attributes shared between two records that come before the first differentiating attribute in the category order.

Entropy is a measure from information theory. It describes how attributes in a category are distributed. This well known measure is related to the randomness of the distribution of the attributes.

An enumeration tree is a data structure with nodes connected by edges. An enumeration tree may represent a dataset with data and metadata obtained from a dataset.

A filter comprises one or more attributes belonging to the same category that have been specified as the required value(s) for that category.

Merit value or merit is a measure of how efficient a category is in filtering data.

A nodal attribute count is a count stored in an enumeration tree node that tracks how many times an attribute appears at the end of the preceding sequence of parent node attributes in a dataset. All nodal attribute counts for a given attribute sum to the associated attribute count.

Figure 1:
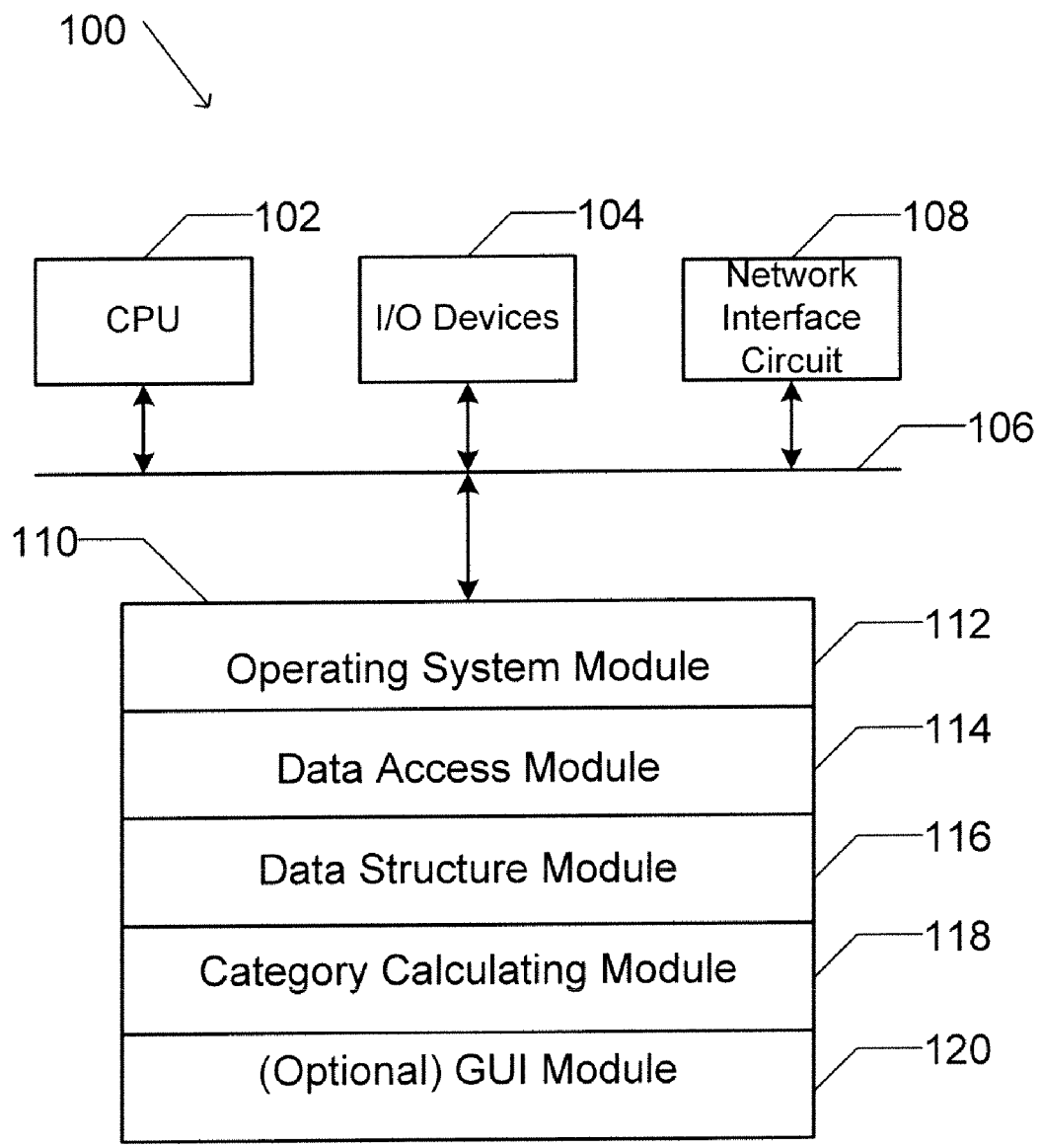
FIG. 1 illustrates a computer constructed in accordance with an embodiment of the invention.

FIG. 1 illustrates a computer 100 configured in accordance with an embodiment of the invention. The computer 100 includes standard components, including a central processing unit 102 and input/output devices 104, which are linked by a bus 106. The input/output devices 104 may include a keyboard, mouse, touch screen, monitor, printer, and the like. A network interface circuit 108 is also connected to the bus 106. The network interface circuit 108 provides connectivity to a network (not shown), thereby allowing the computer 100 to operate in a networked environment.

A memory 110 is also connected to the bus 106. The memory 110 stores executable instructions to implement operations of the invention. In an embodiment, the executable instructions include one or more of the following modules: an operating system module 112, a data access module 114, a data structure module 116, a category calculating module 118 and an optional Graphical User Interface (GUI) module 120.

The operating system module 112 includes executable instructions to handle various system services, such as file services or to perform hardware dependant tasks.

The data access module 114 includes executable instructions to modify a data source query (e.g., a Structured Query Language (SQL) query, a MultiDimensional eXpressions (MDX) query, a Data Mining Extensions (DMX) query) to include specified filters. The data access module 114 also includes executable instructions to apply the generated data source query to an underlying data source, which may form a portion of computer 100 or may be accessed as a separate networked machine through the network interface circuit 108.

The data structure module 116 includes executable instructions to build an enumeration tree data structure. This module also includes instructions to parse the enumeration tree in accordance with an embodiment of the invention.

The category calculating module 118 includes executable instructions to determine the categories that will efficiently filter the dataset and to organize the category information. In an embodiment, the category information is passed to the GUI module 120. In another embodiment, the category information is passed to another process.

The GUI module 120 is an optional component and may rely upon standard techniques to produce graphical components of a user interface, e.g., windows, icons, buttons, menu and the like. The GUI module 120 displays the successive sets of filtering categories, the filtered dataset results and the like to the user.

The executable modules stored in memory 110 are exemplary. It should be appreciated that the functions of the modules may be combined. In addition, the functions of the modules need not be performed on a single machine. Instead, the functions may be distributed across a network, if desired. Indeed, the invention is commonly implemented in a client-server environment with various components being implemented at the client-side and/or the server-side. It is the functions of the invention that are significant, not where they are performed or the specific manner in which they are performed.

Figure 2:
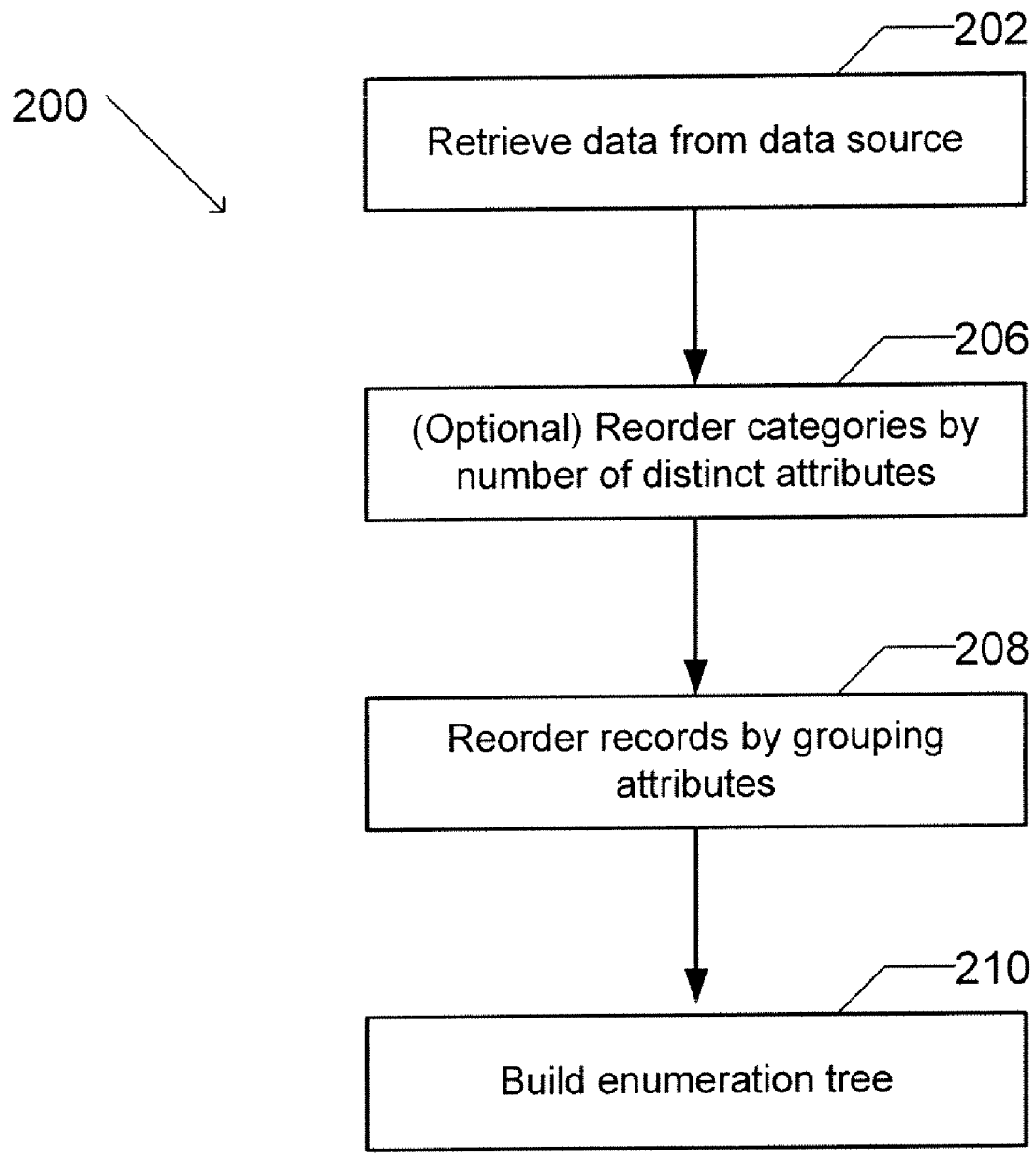
FIG. 2 illustrates processing operations for building the required enumeration tree structure associated with an embodiment of the invention.

FIG. 2 illustrates processing operations 200 for building the enumeration tree data structure that may be implemented by the computer 100 while executing instructions from the data access module 114 or the data structure module 116. In the first processing operation of FIG. 2, the data access module retrieves a dataset from the data source 202 and optionally stores it in a temporary table.

In one embodiment, the data structure module 116 then optionally reorders the categories in an ascending order of number of distinct attributes 206. In an embodiment, if multiple categories have the same number of distinct attributes, they are grouped in their original order. Note that the categories need not be physically reordered. In an embodiment, it is determined whether it is more efficient to physically reorder the categories or number them so they appear to be reordered in interactions with the data access module 114. This is an optional operation; no operation in the process is dependent on this operation 206.

The next processing operation is to reorder the records by grouping the attributes in a descending order 208. The data structure module 116 begins by grouping on the lead category and progressing through the order.

Once this restructuring is complete, the data structure module 116 builds the enumeration tree 210. The data structure is tree-based, consisting of a single tree or a plurality of trees; one root node exists for each distinct attribute in the lead category.

The data structure module 116 begins by selecting the leading category attribute of the first record and sets it as the root node attribute. In one embodiment, the nodes of the enumeration tree contain an attribute, an ID for the parent node and a nodal attribute count. The remainder of the record is added to the tree as a series of nodes one for each attribute—creating a single branch. The data structure module 116 tracks the last record added to the enumeration tree. This record information is used in adding subsequent records to the enumeration tree.

Figure 3:
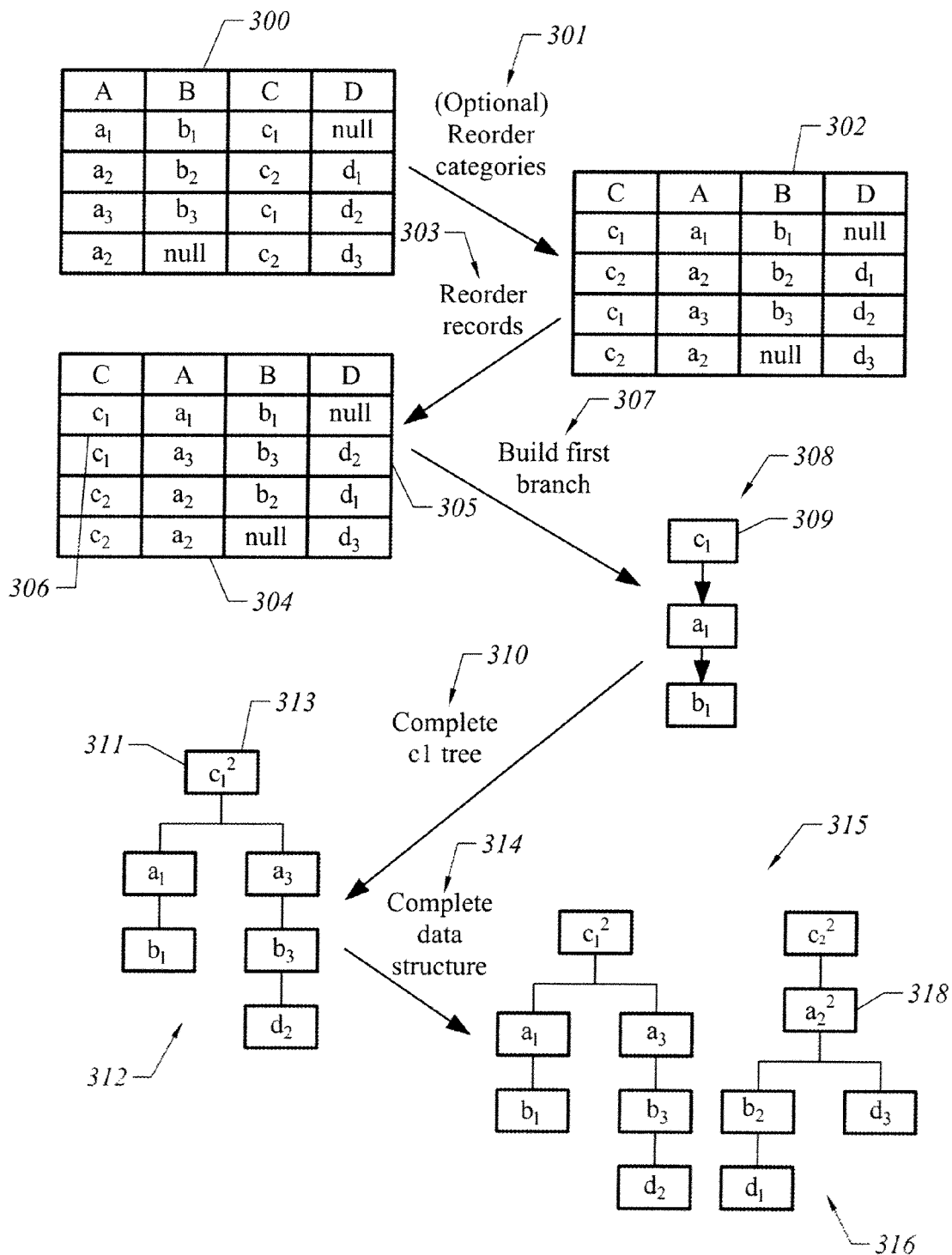
FIG. 3 illustrates the conversion of a dataset into the enumeration tree data structure in accordance with an embodiment of the invention.

To add more records to the enumeration tree, the data structure module 116 selects the next record in the dataset. This record is compared to the previously added record to check for common leading attributes. All common leading attributes share the same node, much like in a prefix tree, and a nodal attribute count tracks how many records are sharing a single node. The remaining attributes of the record are added as a sub-branch beginning at the node of the last common leading attribute. If there are no common leading attributes for a record and the previously added record, then a new root node is created. Note that null values are not stored in the enumeration tree. Records with null values in the leading category select their root node attribute from the first category with a non-null value FIG. 3 illustrates the process of building the enumeration tree in one embodiment of the invention based on the example dataset in the table 300. First, the columns of the table 300 are optionally reordered based on the number of distinct attributes 301. Next, the records of the resulting table 302 are reordered by grouping the attributes 303. Then the resulting table 304 is used to build the enumeration tree 315.

The data structure module 116 selects the first attribute 306 from the leftmost column of the temporary table 304 and sets it as the root node 309. The first branch of the enumeration tree is created 307 resulting in the tree 308. Note that null values are not stored in the enumeration tree.

From there, a branch is created for each further record with the root node 309 attribute $c_1$ in its leftmost column, 310. The record 305 is compared to the previously added record to determine the common leading attributes. The nodes of the common leading attributes, in this case attribute c1 and node 311, are shared. The nodal attribute count, depicted as a superscript (e.g., 313), is incremented by 1. And, as illustrated, the remainder of record 305 is stored as a sub-branch in the enumeration tree 312.

The remainder of the data structure 315 is created by repeating this process for the remaining distinct attributes of the leftmost column 314. This completes the enumeration tree 316. As previously mentioned, all common leading attributes use the same node, hence the shared node 318.

Figure 4:
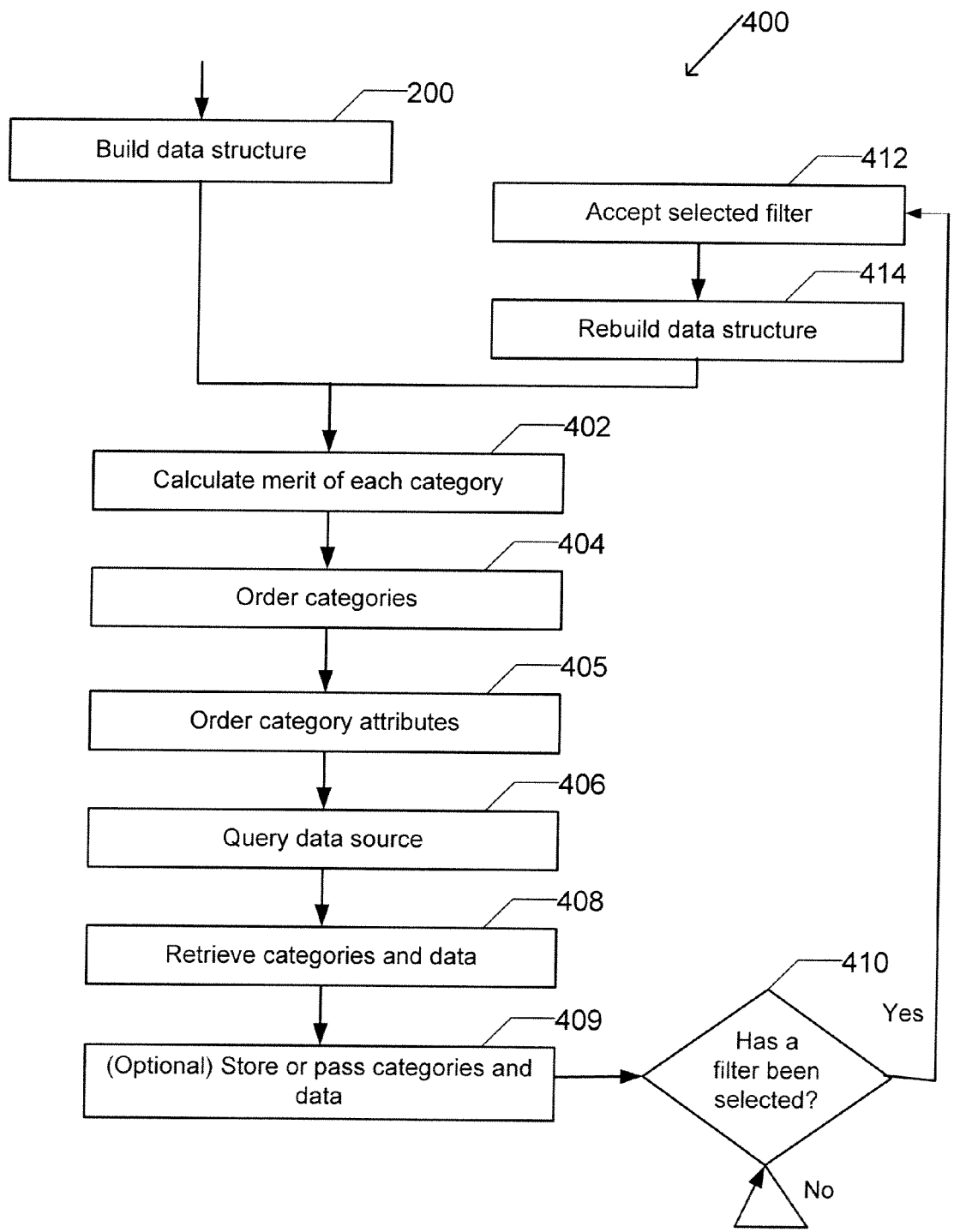
FIG. 4 illustrates processing operations for determining a set of categorical filtering options in accordance with a general embodiment of the invention.

FIG. 4 illustrates processing operations 400 for determining a set of categorical filtering options that may be implemented by the computer 100 in a general embodiment, while executing instructions from the data access module 114, the data structure module 116 or the category calculating module 118. As illustrated, the process continues from the enumeration tree data structure building process 200 of FIG. 2. The next operation is to use a predetermined formula and process to calculate the merit of each category 402. The categories are then ordered 404 and the attributes of each category are ordered 405.

In one embodiment, the categories are ordered by ascending merit and in another embodiment, by descending merit. In one embodiment, the categories are ordered by merit and another value derived from the data or associated metadata. In one embodiment, the category attributes are ordered by ascending frequency and in another embodiment, descending frequency. Other embodiments include, but are not limited to, ordering category attributes alphabetically, numerically, according to a user specification submitted via the GUI module 120 or leaving the attributes unordered.

The application then queries the data source 406 using the specified filters and retrieves the applicable dataset and categories 408. The application can then optionally store the dataset and categories or pass them on to another process or the GUI module 120, 409. The application may pass on any subset of the original set of categories. This subset may be based on a criterion set by the data structure module 116 (e.g., highest merit, lowest merit, closest to a target value), a similar criterion specified by the GUI module 120 or a request from the user.

The computer 100 waits for the user, or another agent, to select a filter 410. If a filter is selected (410—Yes), then the category calculating module 118 accepts the filter 412 and rebuilds the enumeration tree 414. In rebuilding the enumeration tree, the data structure module 116 copies the branches with an attribute of the selected filter in the associated category from the current enumeration tree. The process then cycles through operations 402 through 409 again, this time querying for a filtered dataset during operation 406 using the specified filter. If the filter is made up of more than one attribute, then an "or" statement is used in the query. If a filter is not selected (410—No), then the process stops until one is selected.

Figure 5:
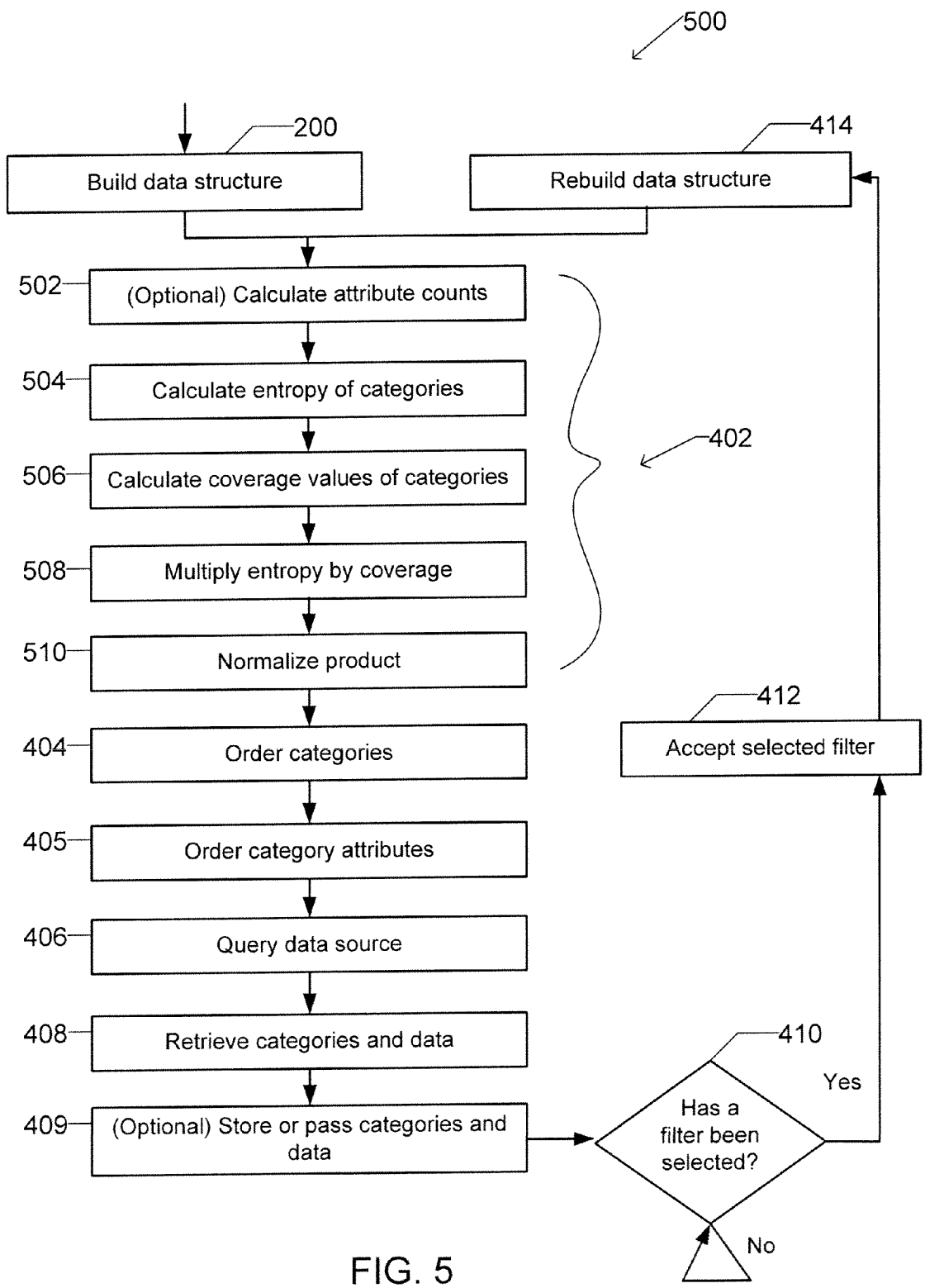
FIG. 5 illustrates processing operations for determining a set of categorical filtering options in accordance with a specific embodiment of the invention.

FIG. 5 illustrates processing operations 500 for determining a set of categorical filtering options that may be implemented by the computer 100 in a specific embodiment of the invention, while executing instructions from the data access module 114, the data structure module 116 or the category calculating module 118. FIG. 5 illustrates processing operations associated with an alternative embodiment of the invention. Many of these operations were already discussed in connection with FIG. 4. Therefore, only the new operations will be discussed.

The first sub-operation 502, to calculate the attribute counts, of calculating merit is optional. In an embodiment, to calculate the attribute counts 502 the data structure module 116 parses the enumeration tree while the category calculating module 118 sums the nodal attribute counts for each distinct node attribute. Calculating the attribute counts first provides a data structure (e.g., a temporary reference table, a list, a hash table, or a tree) for retrieval of a summary data for future calculations by the category calculating module 118. In another embodiment, this sub-operation is not performed and the category calculating module 118 requests that the data structure module 116 parse the enumeration tree to derive specific attribute counts every time one is required.

The next sub-operation is to calculate the entropy (E) of the categories 504 using an entropy formula, such as:

$$E = -K \sum_{i=1}^{n} p(cat_i) \cdot \log(p(cat_i))$$

where:

K is an optional constant;

n is the number of distinct attributes in the category;

log is the logarithm function, the base of which varies with different embodiments and may include the natural logarithm, common logarithm, binary logarithm or indefinite logarithms;

$cat_i$ is the $i^{th}$ distinct attribute in the category; and $p(cat_i)$ is the probability that an attribute is $cat_i$, which is equivalent to the number of times $cat_i$ occurs divided by the number of records in the dataset. The values used to calculate $p(cat_i)$ are retrieved from the attribute count data structure constructed in the previous sub-operation 502 or derived from the enumeration tree when required.

The next sub-operation is to calculate category coverage 506. Category coverage is determined by the percentage of attributes in the category. In one embodiment, the category calculating module 118 retrieves the attribute counts from the attribute count data structure and the number of records in the dataset from the data source. In another embodiment, the attribute counts are derived from the enumeration tree. The category entropies are then multiplied by the corresponding category coverage values 508.

The next sub-operation is to normalize the product from the previous sub-operation 510. Normalization may be performed by dividing the entropy-coverage product by a normalizing value z that is correlated with n, the distinct number of attributes in the category. In one embodiment z is monotonic in n. In one embodiment where z is monotonic in n, z is super linear in n. In one embodiment where z is super linear in n, z is equal to n log(n). Examples of the logarithm's base include 2, e (i.e., 2.718281828 where $\log_e$ is denoted ln) and 10. In one embodiment where z is monotonic in n, z is linear in n. In one embodiment where z is linear in n, z is equal to n. The value of n is determined from the attribute count data structure or from parsing the enumeration tree.

The result of normalization is the merit value (M). Note that the merit value is proportional to entropy and coverage, and inversely proportional to the number of distinct attributes in the category.

Figure 6:
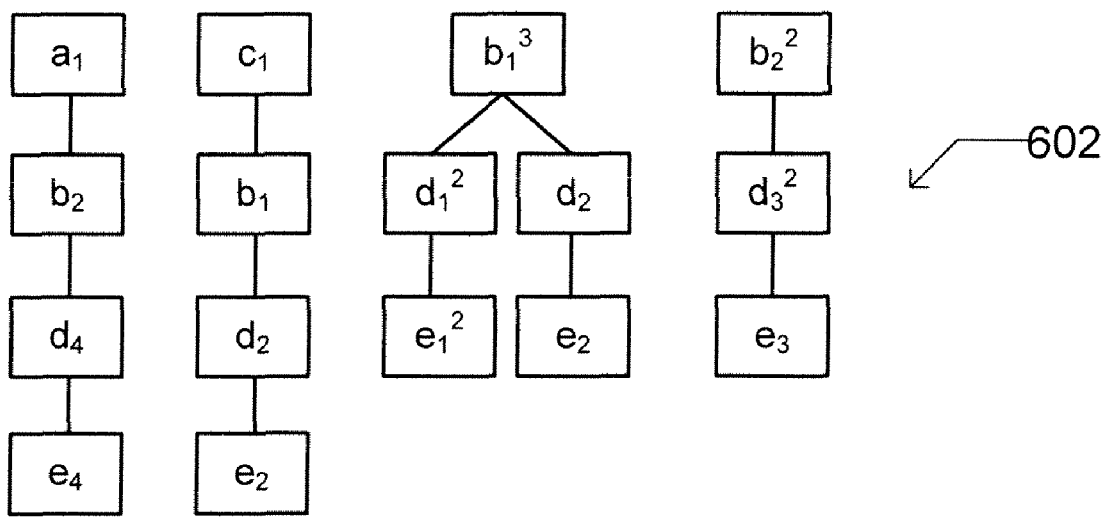
FIG. 6 illustrates a sample dataset and corresponding enumeration tree data structure configured in accordance with an embodiment of the invention.

FIG. 6 illustrates a sample dataset 600 to be used in the following example of the processing operations 500 of FIG. 5. The corresponding enumeration tree 602 was constructed per the processing operations 200 of FIG. 2.

After the data structure module 116 builds the enumeration tree, the category calculation module 118 takes over, periodically sending requests to the data structure module 116 to parse the enumeration tree for information. The first operation 502 is to calculate attribute counts. This operation 502 is optional. The attribute counts for the dataset 600 are:

| B | A | D | E | C |
|---|---|---|---|---|
| $\|b_1\| = 4$ | $\|a_1\| = 1$ | $\|d_1\| = 2$ | $\|e_1\| = 2$ | $\|c_1\| = 1$ |
| $\|b_2\| = 3$ |  | $\|d_2\| = 2$ | $\|e_2\| = 2$ |  |
|  |  | $\|d_3\| = 2$ | $\|e_3\| = 1$ |  |
|  |  | $\|d_4\| = 1$ | $\|e_4\| = 1$ |  |

Entropy values are then calculated as per operation 504:

$$E(B) = -(1)[(4/7)\ln(4/7) + (3/7)\ln(3/7)] = 0.683$$

$$E(A) = (-1)[(1/7)\ln(1/7)] = 0.278$$

$$E(D) = \frac{-(1)[(2/7)\ln(2/7) + (2/7)\ln(2/7) +}{(2/7)\ln(2/7) + (1/7)\ln(1/7)]} = 1.352$$

$$E(E) = \frac{-(1)[(2/7)\ln(2/7) + (2/7)\ln(2/7) +}{(1/7)\ln(1/7) + (1/7)\ln(1/7)]} = 1.272$$

$$E(C) = -(1)[(1/7)\ln(1/7)] = 0.278$$

The next operation is to calculate coverage values 506:

$$c(B) = 7/7 = 1$$

$$c(A) = 1/7 = 0.143$$

$$c(D) = 7/7 = 1$$

$$c(E) = 6/7 = 0.857$$

$$c(C) = 1/7 = 0.143$$

Then the entropy and coverage values are multiplied 508:

$$E(B)*c(B) = 0.683*1 = 0.683$$

$$E(A)*c(A) = 0.278*0.143 = 0.0398$$

$$E(D)*c(D) = 1.352*1 = 1.352$$

$$E(E)*c(E) = 1.272*0.857 = 1.090$$

$$E(C)*c(C) = 0.278*0.143 = 0.0398$$

The next operation is to normalize the products of the previous operation 510:

$$M(B) = [E(B)*c(B)]/n\ln(n) = 0.683/(2*\ln 2) = 0.493$$

$$M(A) = [E(A)*c(A)]/n\ln(n) = 0.0398/(1*\ln 1) = NaN$$

$$M(D) = [E(D)*c(D)]/n\ln(n) = 1.352/(4*\ln 4) = 0.244$$

$$M(E) = [E(E)*c(E)]/n\ln(n) = 1.090/(4*\ln 4) = 0.196$$

$$M(C) = [E(C)*c(C)]/n\ln(n) = 0.0398/(1*\ln 1) = NaN$$

Here, NaN denotes "not a number" and results from division by zero.

Then the categories are ordered 404, in this case by descending merit:

$$M(B) = 0.493$$

$$M(D) = 0.244$$

$$M(E) = 0.196$$

$$M(A) = NaN$$

$$M(C) = NaN$$

Merit values of NaN are ranked after all other values. An aspect of using n ln(n) as the normalizing value z is that categories with just one distinct attribute have a merit value of NaN.

The next operation, which is optional, is to order the attributes of each category 405 of FIG. 5, in this case by descending frequency:

| B | A | D | E | C |
|---|---|---|---|---|
| $b_1$ | $a_1$ | $d_1$ | $e_1$ | $c_1$ |
| $b_2$ |  | $d_2$ | $e_2$ |  |
|  |  | $d_3$ | $e_3$ |  |
|  |  | $d_4$ | $e_4$ |  |

The data access module 114 then queries the data source for the dataset 600, 406 of FIG. 5 and retrieves the applicable dataset and categories 408 of FIG. 5. The application then optionally stores the dataset and ordered categories or sends them to another process or to the GUI module 120, 409 of FIG. 5. In an embodiment, the GUI module 120 provides the user with categories that have merit values greater than zero. For example, in this case the GUI module 120 displays categories B, D and E. The process 500 then waits for another filter to be specified before continuing.

Figure 7:
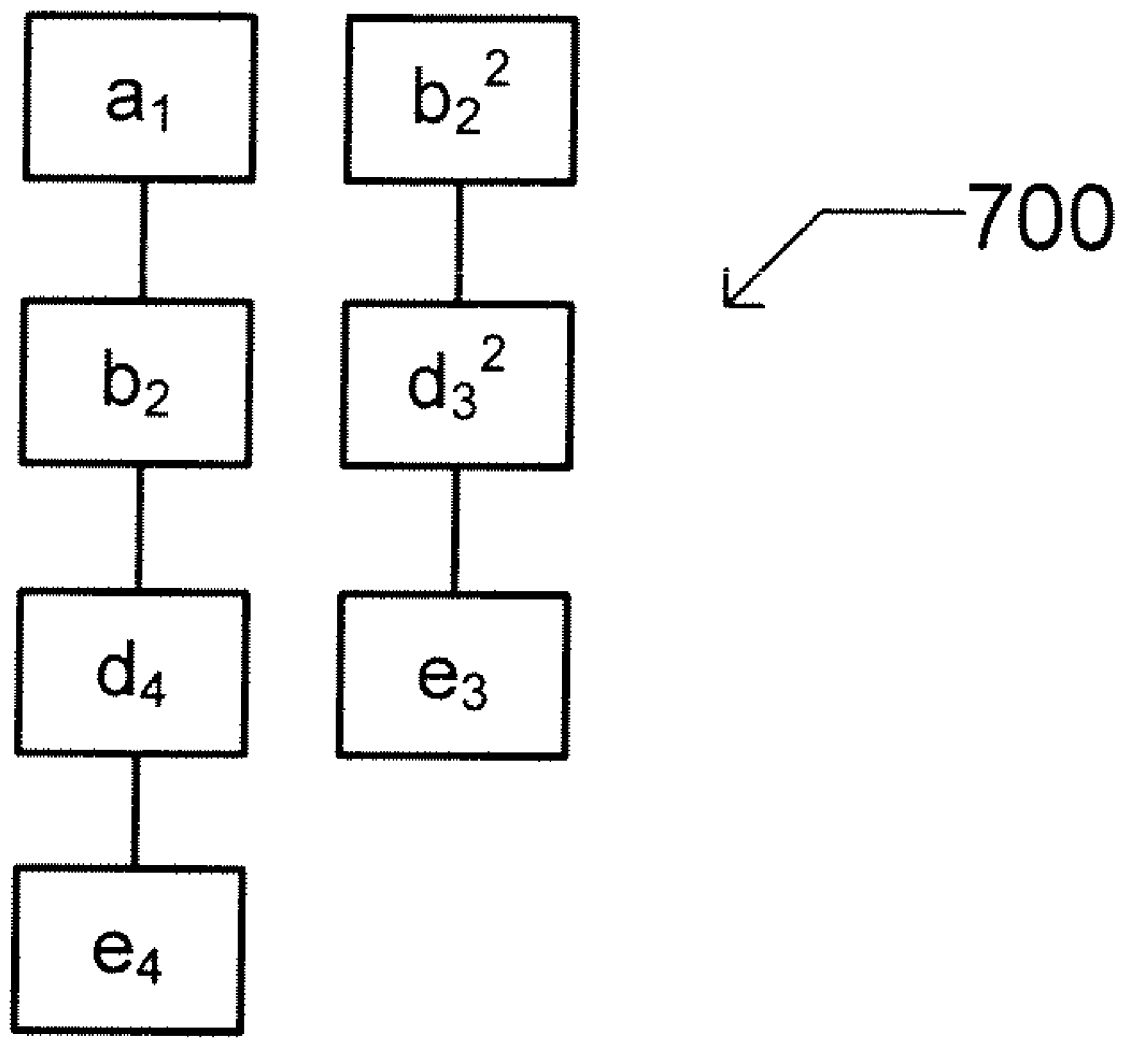
FIG. 7 illustrates the enumeration tree data structure of FIG. 6 after being reconstructed based on a supplied filter.

When a filter is selected, the data structure module 116 accepts that filter and rebuilds the enumeration tree by copying the relevant branches into a new enumeration tree. For example, if the selected filter is B=$b_2$, the enumeration tree 700 of FIG. 7 is created.

The category calculating module 118 then performs the set of processing operations 402 of FIG. 5, resulting in the following merit values:

$M(A)=NaN$ $M(D)=0.459$ $M(E)=0.352$ $M(C)=NaN$

The categories are then ordered (404 of FIG. 5), in this case by descending merit:

$M(D)=0.459$ $M(E)=0.352$ $M(A)=NaN$ $M(C)=NaN$

And the category attributes are optionally ordered (405 of FIG. 5), in this case by descending frequency:

| B | A | D | E | C |
|---|---|---|---|---|
| $b_2$ | $a_1$ | $d_3$ | $e_3$ | |
| | | $d_4$ | $e_4$ | |

The data access module 116 then queries the data source (406 of FIG. 5) for a new dataset filtering on B=$b_2$, and retrieves the applicable dataset and categories (408 of FIG. 5). The application then optionally stores a new set of ordered categories and the filtered dataset or sends them to another process or to the GUI module 120, (409 of FIG. 5). The process 500 waits for another filter to be specified before continuing.

Embodiments of the invention include a computer readable storage medium storing executable instructions. The computer readable storage medium includes instructions to retrieve a dataset from a data source. The dataset includes a set of records and a set of categories. The instructions include instructions to reorder the set of records by successively grouping on each category in the set of categories. The instructions include instructions to build an enumeration tree. In an embodiment, a category of the computer readable medium includes a set of attributes. In an embodiment, the computer readable medium additionally includes executable instructions to calculate a count of distinct attributes in each category in the set of categories and reorder the categories by ascending order of the count of distinct attributes. In an embodiment, the computer readable medium additionally includes executable instructions to accept a filter, copy a set of applicable branches from the enumeration tree, wherein an applicable branch of the set of applicable branches complies with the filter, and build a new enumeration tree using the set of applicable branches.

An aspect of the invention is the provision of a simple technique to start or modify an analysis workflow. The inability of most users to navigate or apply filters efficiently to a dataset makes the task of analysis difficult. This invention provides techniques such that the user can begin an analysis by locating relevant components. The user supplies a relevancy parameter, for example a set of keywords, to locate the relevant filters or other components for analysis. The computer 100, derives the relevance of components based on the relevancy parameter, and then displays an initial analysis view. Components within the analysis view that a user may employ to perform an analysis include categories (categories are often coterminous with dimensions), filters drawn from attributes within a category, and measures. This initial analysis view provides users with a place to start their analysis. This initial analysis view also promotes the most relevant or meritorious components within the depiction of available components so that the user can easily select them. This allows the user to perform an analysis without having to navigate or know the structure of the information. As the user performs an analysis, the relevant components within the depiction of the dataset in a GUI are updated. This aspect of the invention draws upon the above description and FIGS. 1-7, while being fully described in connection with the following detailed description taken in conjunction with FIGS. 8-15.

Figure 8:
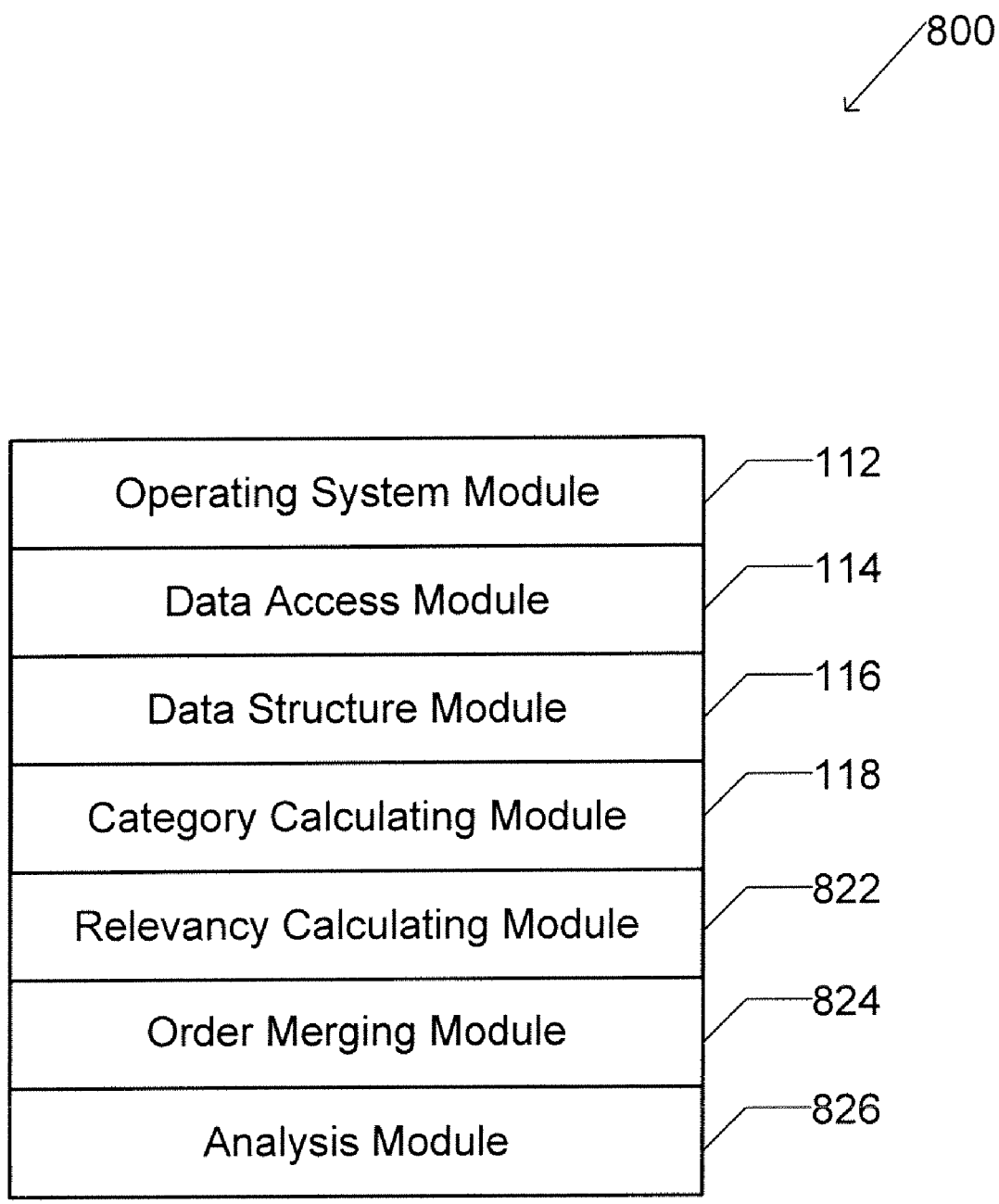
FIG. 8 illustrates an alternative memory for the computer of FIG. 1 in accordance with an embodiment of the invention.

FIG. 8 illustrates an alternative memory for the computer of FIG. 1. A memory 800 stores executable instructions to implement operations of the invention. In an embodiment, the executable instructions include one or more of the following modules: the operating system module 112, the data access module 114, the data structure module 116, the category calculating module 118, a relevancy calculating module 822, an order merging module 824, and an analysis module 826.

The data structure module 116 includes executable instructions to build an enumeration tree data structure. In an embodiment, the data structure module 116 includes executable instructions to manage one or more category ensembles. A category ensemble contains two or more categories (e.g. dimensions) and one or more measures. A category ensemble includes a collection of metadata for one or more datasets or the datasets themselves as defined by the metadata. In one specific embodiment, a category ensemble is a table that is stored in an index. Metadata in a category ensemble is associated with the ensemble, with a category or a measure within the ensemble or with the data associated with the ensemble. Metadata associated with the ensemble may include: name, multilingual name (e.g., localized name, delocalized name), description, user tags, user comments, usage metrics (e.g., use frequency or currency and type of use by user or user group), data quality level (e.g., trust, completeness, data trustworthiness, data currency (i.e., freshness)), data design (e.g., category ensemble creator and their trust level), and favorite information (e.g. favorite for a user or a group). Metadata associated with components (e.g., categories and measures) within an ensemble is generally parallel to the ensemble metadata with appropriate changes, e.g., the description is for the component and the data design information records the component creator. Metadata associated with the data may be stored proximate to the data and associated with the category ensemble. This metadata may include: data source information (e.g., data source type, location, version), data information (e.g., date stamp, data language, access restrictions), data design information (e.g., semantic abstraction creator and their trust level), data lineage information (e.g., sources and previously applied transforms) and the like.

The category calculating module 118 includes executable instructions to determine the categories that will efficiently filter the dataset and organize the categories. This module includes instructions to order the categories by merit. Merit is a measure of the efficiency of an attribute acting as a filter to partitioning a dataset. A category with high merit is typically characterized by high entropy, high coverage and low cardinality. A partition is a part of a dataset. To partition a dataset is to divide the dataset into parts that when recombined reconstruct all of the dataset.

The relevancy calculating module 822 includes executable instructions to search a category ensemble, its components, and its associated metadata. The relevancy calculating module accepts one or more relevancy parameters. Relevancy is the degree of match to a specified relevancy parameter. The types of matching include matches based on one or more keywords having a degree of correspondence with a name, multilingual name, description, user tag, user comment and the like. Alternatively, the relevancy parameters include those based on target or threshold values for usage metrics, data source information, data quality level, data lineage metadata, favorite information, data design information, data metadata and the like. Determining relevancy by threshold or target value can be combined with a keyword search. The module includes instructions to search over a plurality of category ensembles and order category ensembles by relevancy. The module further includes instructions to determine the relevancy of components (e.g., measures and categories) in a category ensemble and order them. This module stores the result of the relevancy search and an initial order. The module 822 can include instructions to interpret regular expressions, mathematical expressions or the like supplied by the user. For example, the user can specify a numerical threshold value for an aspect of a category ensemble and relate it by an inequality operator. The relevancy calculating module 822 may have instructions to determine relevancy of components within metadata associated with metrics for usage, feedback and data quality.

The order merging module 824 includes executable instructions to merge two or more orders. This module includes instructions to order the categories heterogeneously with the meritorious and relevancy categories not mixing. Alternatively, the merged order can be homogenous with a mixing of meritorious and relevancy categories. The module can order the categories by merit, relevancy, alphabetically and the like.

Analysis module 826 includes executable instructions to support the analysis of datasets. This includes presenting analysis views of datasets. This also includes accepting a client's changes to an analysis view. Analysis module 826 includes executable instructions to support entering an analysis workflow from another business intelligence workflow. The analysis module displays available and selected categories and measures. This helps users determine how best to apply filters that include or exclude categories as well as to select measures.

The executable modules stored in memory 800 are exemplary. It should be appreciated that the functions of the modules may be combined. In addition, the functions of the modules need not be performed on a single machine. It is the functions of the invention that are significant, not where they are performed or the specific manner in which they are performed.

Figure 9:
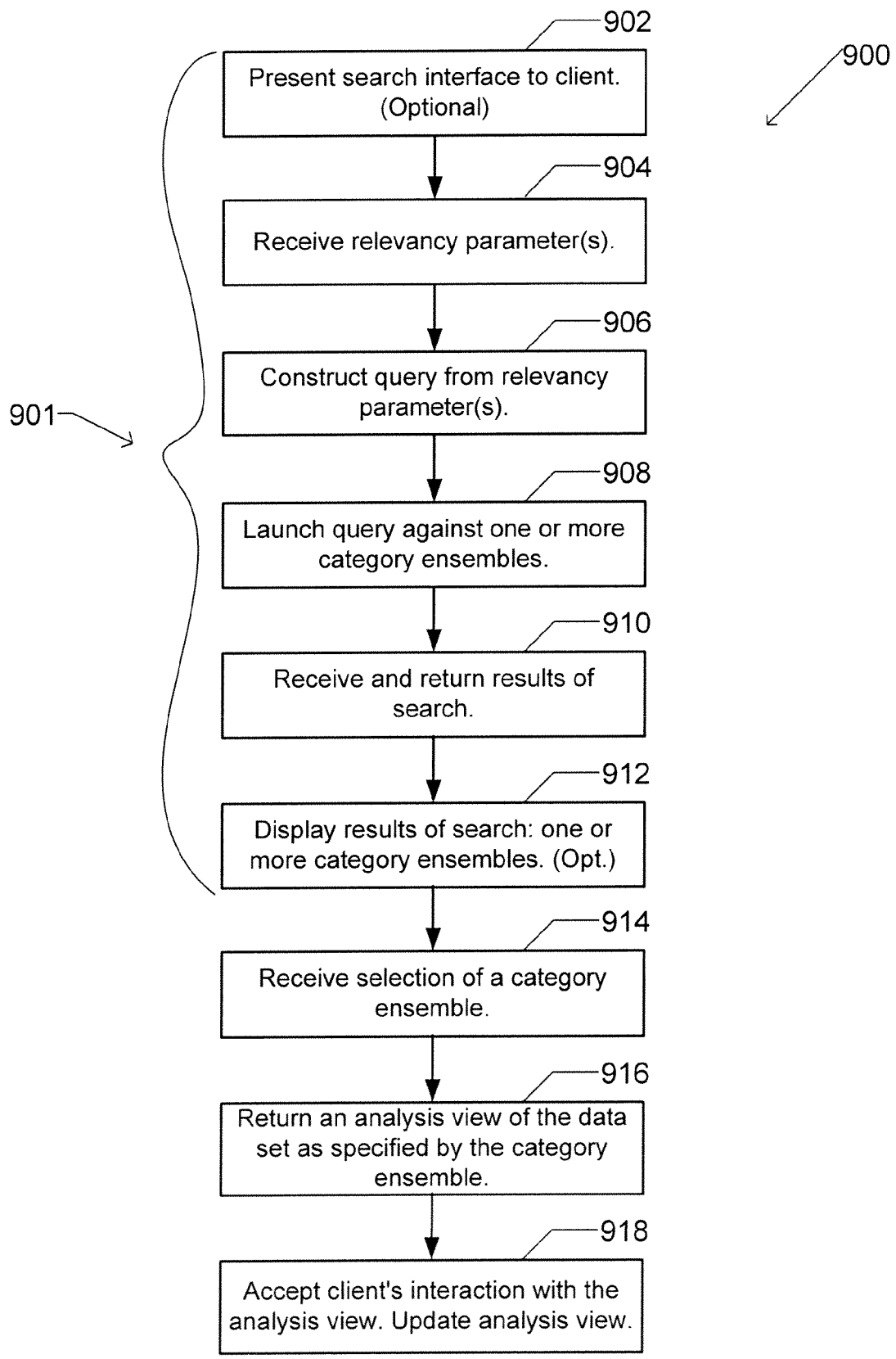
FIG. 9 illustrates processing operations supporting a search over a set of category ensembles in accordance with an embodiment of the invention.

FIG. 9 illustrates a set of processing operations 900 corresponding to a workflow of determining the relevancy of each category ensemble in a set of category ensembles so as to select a category ensemble for an analysis view of a dataset. The subset of processing operations 901 show an example of how a search can lead to an analysis view being generated for the dataset. The relevancy calculating module 822 with or without assistance from the GUI module 120 may present a relevancy determination interface to client 902. The client can be a user, a module, another computer or the like. The relevancy calculating module 822 receives one or more relevancy parameters from the client 904. Instructions in relevancy calculating module 822 construct a query using the relevancy parameters 906. This query is launched against a collection of one or more category ensembles 908. Normally, there is a plurality of category ensembles.

Each category ensemble may overlie one or more data sources. Alternatively, two or more category ensembles may overlie a single data source. The category ensembles may overlie a data foundation, semantic abstraction, view or other similar abstraction that itself overlies one or more data sources. Semantic abstraction is the term for a semantic layer that describes an underlying base data source. A semantic abstraction can be a level of abstraction based on a relational, OLAP, or other data source or a combination of more than one existing semantic layers. A universe is a specific form of semantic abstraction where the semantic abstraction includes data model objects that describe the underlying data source and define dimensions, attributes and measures that can be applied to the underlying data source and data foundation metadata that describes a connection to, structure for, and aspects of the underlying data source. A data model object is an object defined within a semantic domain that represents a dimension of the underlying data source, represents relationships between dimension members and attributes, or provides calculations from, based on or designed to be applied to an underlying data source. Typically, in a universe a data model object is assigned a common business term such that the user does not need to understand the specific logic of the underlying data source but can work with familiar terminology when constructing queries or otherwise accessing the data. Examples of common business terms include: customer, employee, product line, revenue, profit, attrition, fiscal year, quarter, and the like.

A dimension is a type of data model object that represents a side of a multidimensional cube, a category, a column, a row or a set of data items within a data source. Each dimension represents a different category, such as region, time, or product type. Attribute values associated with a dimension can also act as dimensions. Dimension definitions support the specification of hierarchies to form a hierarchical dimension. Therein, except for a top level dimension, each dimension in a hierarchical dimension is a child with a dimension as parent. The child dimensions within a hierarchical dimension are constrained by their parent dimension. The permissible structure and availability of a dimension are constrained by the dimensions above them in the hierarchy. For example, in a hierarchal dimension based on geography, a country dimension would constrain the "state" dimension below it. A dimension in an abstraction that overlies two or more data sources may be based on more than one of the underlying data sources. Hence, a category in a category ensemble may be based on two or more data sources.

The relevancy calculating module 822 receives and returns the results of searching by relevancy 910. The results include a ranking of relevant category ensembles. For each category ensemble, the results also include a reference to invoke an analysis view of the dataset based on the category ensemble. Optionally, the relevancy calculating module 822 in conjunction with the GUI module 120 displays the results 912. The client makes a selection of a category ensemble 914.

The analysis module 824 returns an analysis view of the dataset 916. The analysis view is characterized by the category ensemble selected in operation 914 from the set of category ensembles returned in relevancy search operations 902 through 912. The analysis view of the dataset may include a set of ordered categories where some categories are selected, a set of measures where one or more measures is selected, and a visualization of the dataset. Examples of visualizations are charts, tables, maps and the like. A selected category may serve as the visualization's domain (e.g., axis in chart, row or column names in table). This category is also known as a breakdown dimension/category. Typically, the visualization has the selected measure as the codomain (e.g., plotted values in chart, entries in table's cells). A codomain is set of values associated with a dataset. In an embodiment, the analysis module 824, possibly in conjunction with the GUI module 120, displays the analysis view of the dataset.

The client performs an analysis. The analysis module 824 accepts the client's interactions with the analysis view and updates the analysis view accordingly 918. The client's interactions with the analysis view include changing the selected measures, the selected categories, the visualization and the like. The selected categories include both those categories selected to serve as a visualization's domain and those categories that contain one or more attributes selected to act as a filter applied to the dataset.

Figure 10:
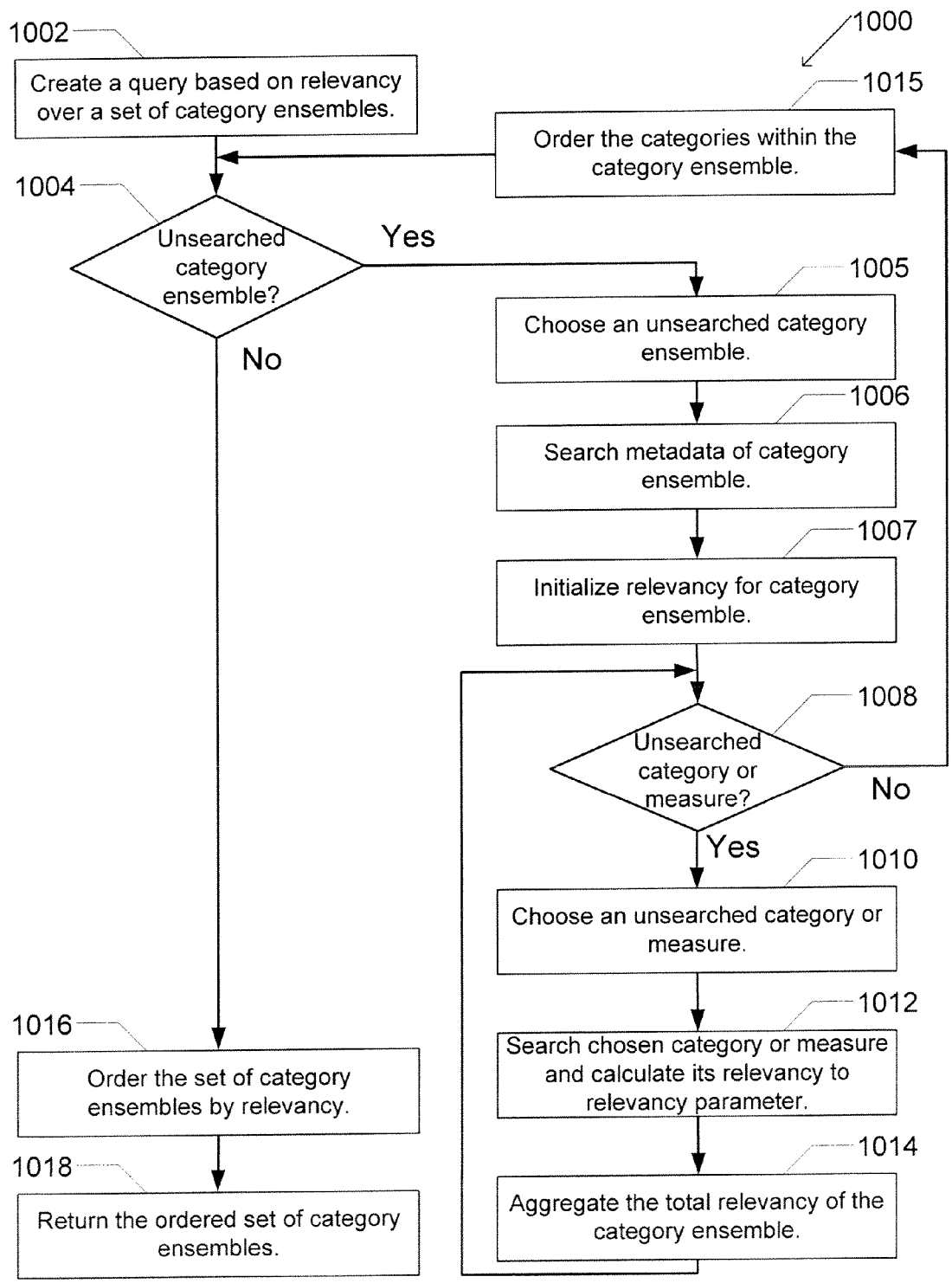
FIG. 10 illustrates processing operations for searching and ordering by relevancy a plurality of category ensembles in accordance with an embodiment of the invention.

FIG. 10 illustrates processing operations for searching and ordering a plurality of category ensembles. FIG. 10 logically lies between processing operations 908 and 910. The set of operations 1000 are implemented by the relevancy calculating module 822. The aim of the processing operations is to determine the relevancy of a set of category ensembles and order them by relevance to one or more relevancy parameters specified in a query.

The relevancy calculating module 822 generates a query based on the relevancy parameters 1002. The query is applied to a set of one or more category ensembles. In an outer iteration loop the existence of unsearched category ensembles is tested 1004. If 1004—Yes, then processing continues by choosing an unsearched category ensemble from the set 1005. The name and metadata for the category ensemble is searched for the relevancy parameter 1006. The relevancy score for the category ensemble is initialized and set to a value that reflects the relevancy of the metadata 1007. The inner iteration loop begins with testing for an unsearched category or measure within the chosen category ensemble 1008. If 1008—Yes, an unsearched category or measure is chosen 1010. The chosen category or measure is generically called the chosen component. This chosen component is searched using the query specifying the relevancy parameter 1012. During the search the relevancy of the chosen component is calculated. The relevancy of the chosen component is aggregated with the relevancy of the previously searched entities within the category ensemble 1014. As shown in FIG. 10, the relevancy for the category ensemble is built up incrementally in the inner iteration loop. In another embodiment, relevancy is computed in an operation in the outer loop.

The inner loop returns to test its exit criterion: if an unsearched category or measure remains in the chosen category ensemble 1008. If 1008—No, the inner loop is complete and processing continues at operation 1015. The relevancy calculating module 822 orders the categories within the category ensemble 1015. The order is by the relevancy of the category to the relevancy parameter. A typical order is in order of more relevant to less relevant. In operation 1004, the existence of unsearched category ensembles is again tested. If 1004—No, the outer loop is terminated. The search across the ensembles is complete and the relevancy results are processed. The relevancy calculating module 822 orders the set of category ensembles according to each ensemble's relevancy to the relevancy parameter 1016. The now ordered set of category ensembles is returned 1018. In an embodiment, the returned values are the order and a set of associated references to the category ensembles.

Figure 11:
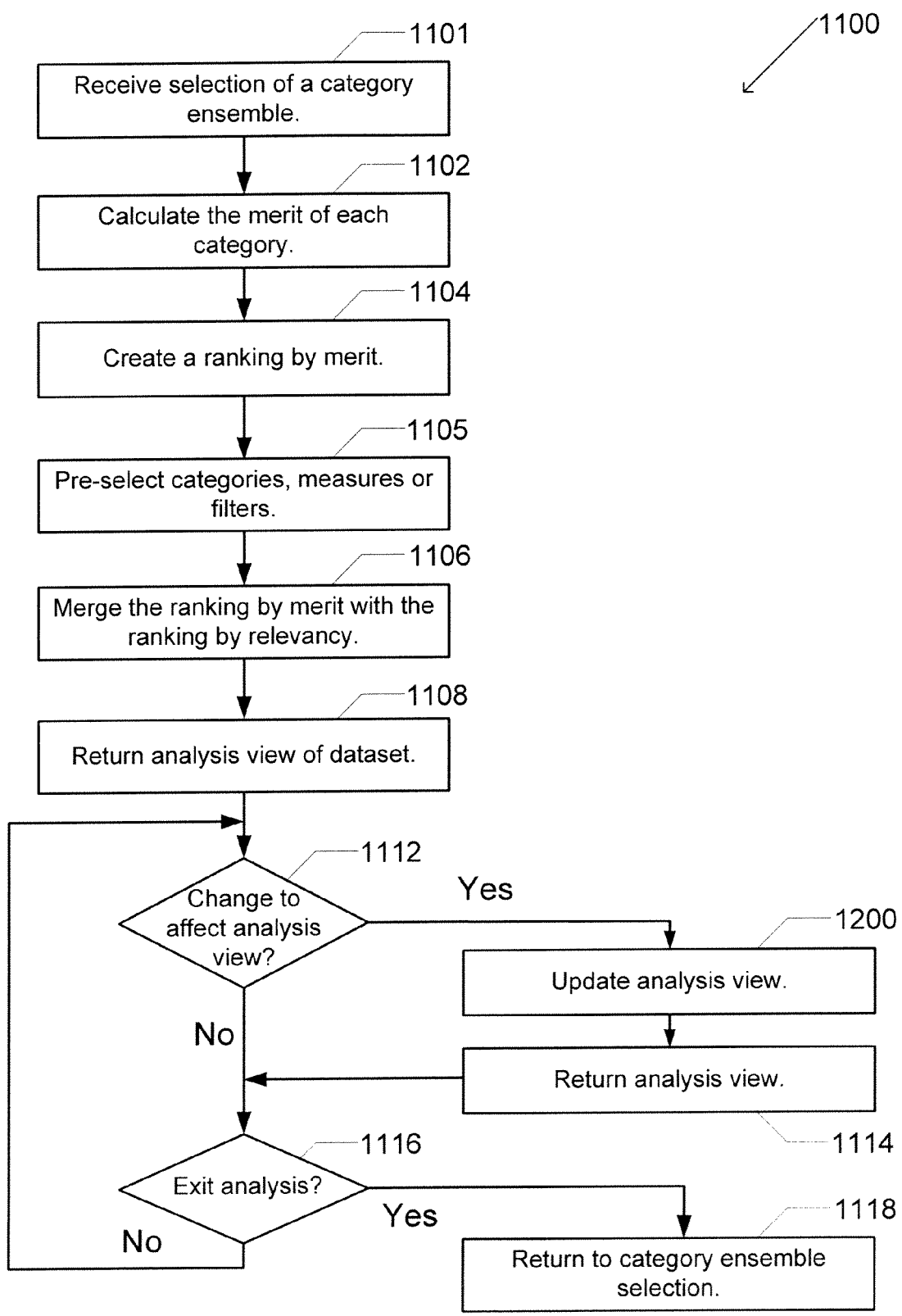
FIG. 11 illustrates processing operations for presenting a category ensemble and underlying dataset in accordance with an embodiment of the invention.

FIG. 11 illustrates processing operations for presenting a category ensemble and underlying dataset in accordance with an embodiment of the invention. Processing operations 1100 commence with the selection of a category ensemble 1101. The merit of each category within the ensemble is calculated 1102. The merit is calculated according to the processing operations described in FIGS. 4 and 5. In particular, processing operations 402, 404 and parts of process 500 are used. The category calculation module 118 calculates the merit of each category. The categories are ordered by merit 1104. A category with high merit is associated with high entropy, high coverage or low cardinality for the category.

To prepare an analysis view with an initial analysis, the analysis module 824 preselects categories, measures or filters to prepare in part an analysis view 1105. Preselection is performed by the analysis module 824 while selection is performed by the client. Once selected, system preselected and client selected components are both termed selected. Selecting a category includes selecting a visualization domain. A selected visualization domain is the domain for a visualization. The selected category/visualization domain may also serve as a breakdown dimension/category when applied outside of the context of visualizations. A selected measure is a codomain for the visualization. Selection of a domain or codomain can be made even if component selection for the visualization is incomplete. A selected filter is comprised of one or more attributes from one or more categories and is used to filter the dataset. Filtering the dataset includes querying a data source or filtering previously retrieved data.

Preselecting may be implemented in any number of ways. An example of the logic for preselection is shown in Table 1. The components preselected for the analysis view are one or more of categories, measures or filters. The analysis module 824 in conjunction with the relevancy calculating module 822 tests to see if any components match the relevancy parameter. In an embodiment, the logic differentiates between single matches and plural matches. The logic includes methods to break ties—a sub case of plural matches. The logic in Table 1 means a category will always be selected. In other embodiments, no selection can result from a system attempting to preselect based on relevancy parameter irrelevant to the category ensemble. In an embodiment, selections resulting from a system preselecting are default selections.

TABLE 1

| Component | No match | Single match | Plural match | Tied relevancy |
|---|---|---|---|---|
| Measure | Select default measure. (Opt.) | Select measure as codomain. | Select most relevant measure as codomain. | Select top tied measures. |
| Category | No selection. | Select category as domain. | Select most relevant category as domain. | Break tie with merit. |
| Attribute | No selection. | Select attribute as filter. (Optional.) | No selection. | No selection. |

The following is an example of the application of processing operation 1105 with the relevancy parameters "product France sales" applied to a category ensemble that includes "Sales" and "Revenue" as measures and "Year", "Division", "Product" and "Country" as dimensions/categories. Per Table 1, there is a keyword match on a measure, in this case "Sales"

so the "Sales" measure is selected. The analysis view will display "Sales" as the measure. There is also a match on a category; in this case "product" matched the category of the same name. According to Table 1, this category becomes the breakdown dimension/category (e.g., domain of visualization) in an analysis. That is, the analysis will feature a visualization of "the sales by product". Assuming there is a plural match on an attribute name "France", no selection is made. However, following the logic in FIG. 10 the "Country" category will be highly ranked. Accordingly, the user may easily select "France" as a filter.

There are many other examples of relevancy parameters that may be used in preselecting components per processing operation 1105. Category ensembles may include metadata on the usage, feedback and data quality of the components in the category ensemble or the underlying data sources. A query on relevancy could specify a desire for only ensembles whose aggregate data quality exceeds a threshold. Another query based on relevancy could require that category ensembles be based on a semantic abstraction created by experts. A query could restrict the data according to its currency, i.e., freshness. A useful restriction is to declare relevant only those category ensembles previously used for analysis. Another query could be made for categories that have high usage or high user feedback rankings. Feedback and usage can be limited to the present user or extended to a group of users. Any of the above criteria can be combined.

The order merging module 824 merges the order by merit with the order by relevancy 1106. In an embodiment, the merging promotes relevancy over merit such that a category with high relevancy is promoted above a category with high merit. When two categories appear equally relevant the tie is broken by merit.

In an embodiment, the orders are merged heterogeneously; that is, the order by merit and the order by relevancy are not mixed. The order by merit may precede the order by relevancy and vice versa. If more order criteria exist, the client may specify a custom order for heterogeneous merging.

In an embodiment, the orders are merged homogeneously. That is, there exists a total ordering for values of merit, relevancy and the like, such that, order reflects the degree categories are meritorious, relevant and so on. There can be a single numeric scale for merit and relevancy such that values for merit and relevancy can be compared to each other.

The analysis view of the dataset is returned 1108. The returned analysis view includes the preselected visualization domains, measures or filters. The analysis view can be displayed in a GUI so that a user may interact with it. Operation 1108 is comparable to operation 916 of FIG. 9. The user may accept this analysis view or choose to perform an analysis by refining the selections in the analysis view. The selected categories, measures or filters can be modified by the user's interactions with the analysis view in the GUI. The analysis module 824 tests whether a change request has been received from the client and whether the analysis view needs updating 1112. The change request can include a request to change the relevancy parameters or selected measures, categories and filters. If 1112—Yes, update the relevancy parameters, selected measures, selected categories or selected filters 1200. The updating of the analysis view of the dataset is detailed in FIG. 12. The analysis view of the dataset is returned 1114. The returned analysis view may be displayed to the user. If 1112—No, no change to analysis view is needed. The analysis module 824 tests whether to exit the analysis 1116. If 1116—Yes, the user or client is presented with a set of category ensembles from which to make another selection 1118. Processing operation 1118 can include operations 910, 912 and 914 of FIG. 9. If 1116—No, then processing continues at operation 1112.

Figure 12:
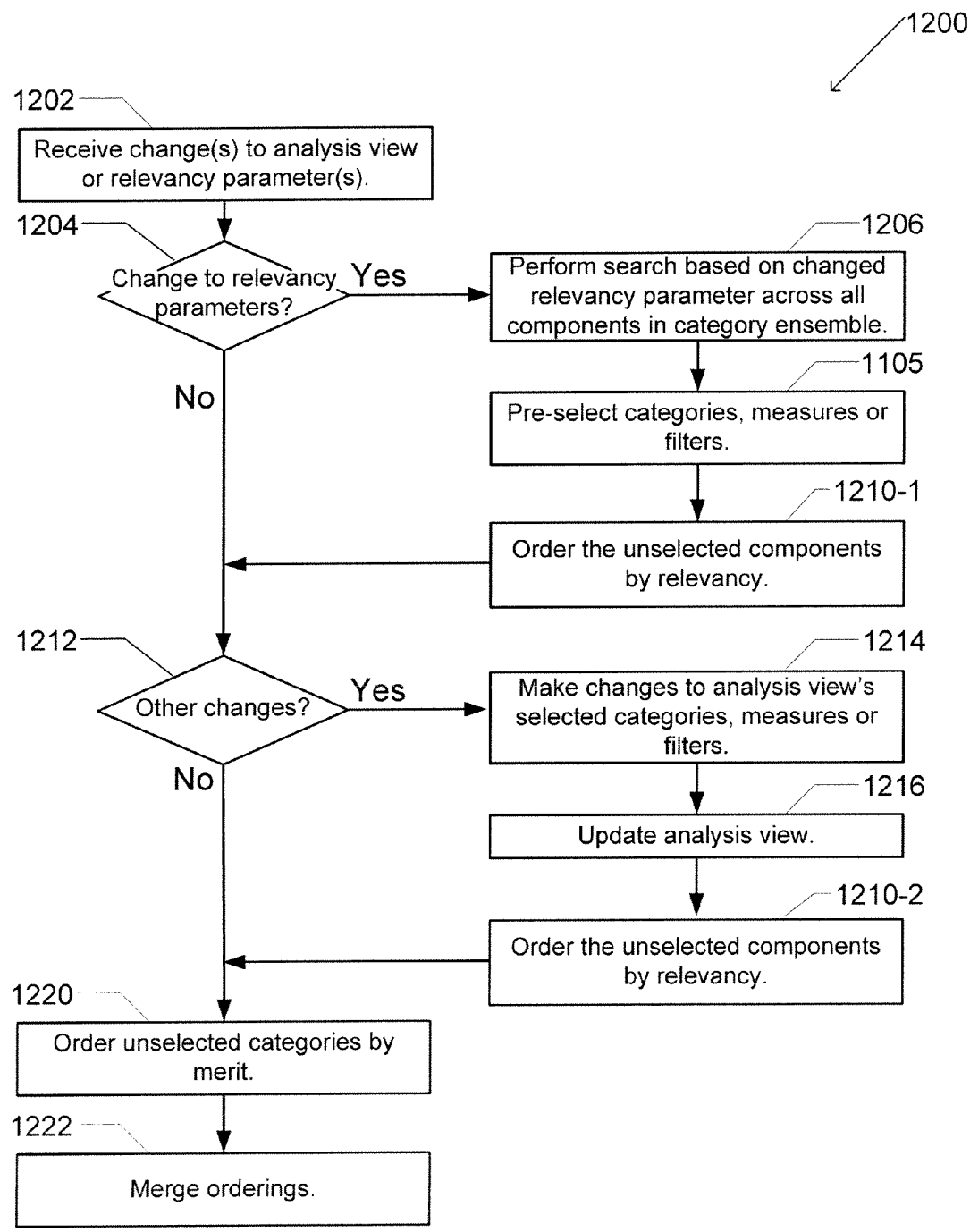
FIG. 12 illustrates processing operations that supplement the operations of FIG. 11.

FIG. 12 illustrates a set of processing operations 1200 that supplement the operations of FIG. 11. These processing operations update an analysis view in response to the client's requested changes. For example, a user may select a new category, measure or filter. An alternate change is the user modifying the relevancy parameters. The analysis module 824 in conjunction with the relevancy calculating module 822 receives a change to the analysis view, selected components or relevancy parameters 1202. The analysis module 824 in conjunction with the relevancy calculating module 822 tests to see if the change is to the relevancy parameters 1204. If 1204—Yes, a search is made based on the new relevancy parameters 1206. The search by relevancy is made across all the components in the category ensemble. A new set of preselections of categories, measures or filters is made based on the new relevancy parameters 1105. Processing operation 1210-1 orders the unselected components by relevancy. In an embodiment, the selected components are ordered by relevancy or convention, e.g., the order in which they were selected.

If 1204—No, a test for other changes to the selected categories, measures or filters is made 1212. If 1212—Yes, analysis module 824 makes corresponding changes to the analysis view's selected categories, measures or filters 1214. This selection change c an include the addition or removal of one or more filters. A filter could be based on a category or an attribute within a category. The analysis view is updated based on the newly selected or unselected category, measure or filter 1216. If the filters have changed, the data is refreshed by refiltering the dataset either by querying the data source or filtering previously retrieved data. Processing operation 1210-2 orders the unselected components by relevancy. The unselected categories are ordered by merit 1220. The order merging module 824 merges the order of the unselected categories by merit with the order by relevancy 1222. In an embodiment, this updated analysis view will be presented to the user via a GUI.

FIG. 13 illustrates a GUI 1300 for accepting a relevancy parameter in accordance with a specific embodiment of the invention. The GUI 1300 can also be used to show the relevancy results and an analysis view. The categories and dataset in the analysis view may be displayed by the GUI module 120 in accordance with any number of techniques, including those described in the following previously filed, commonly owned patent application, which is incorporated by reference herein in its entirety: "Apparatus and Method for Filtering Data Using Nested Panels", application Ser. No. 11/555,206, filed Oct. 31, 2006.

The GUI 1300 includes a relevancy search tab 1302. This tab is characterized by a relevancy parameter box 1304 in which the keywords "sales revenue t-shirt" are shown. By clicking button 1306 these keywords will be used as relevancy parameters. A series of category ensembles 1308-1, 1308-2, 1308-3, 1308-4, 1308-5 and so on, are shown in tab 1302. In an embodiment, the category ensembles are not shown on relevancy search tab 1302. The relevancy is determined by examining these category ensembles. Each category ensemble 1308 includes a name 1310, a description 1312 and a listing of the included dimensions (i.e. categories) and measure 1314. As shown, measures are denoted with a sphere icon and dimensions with a cube icon. For example, in information ensemble 1308-4 the measure is "Headcount" and the dimensions are "Department", "Role" and "Year".

Figure 14:
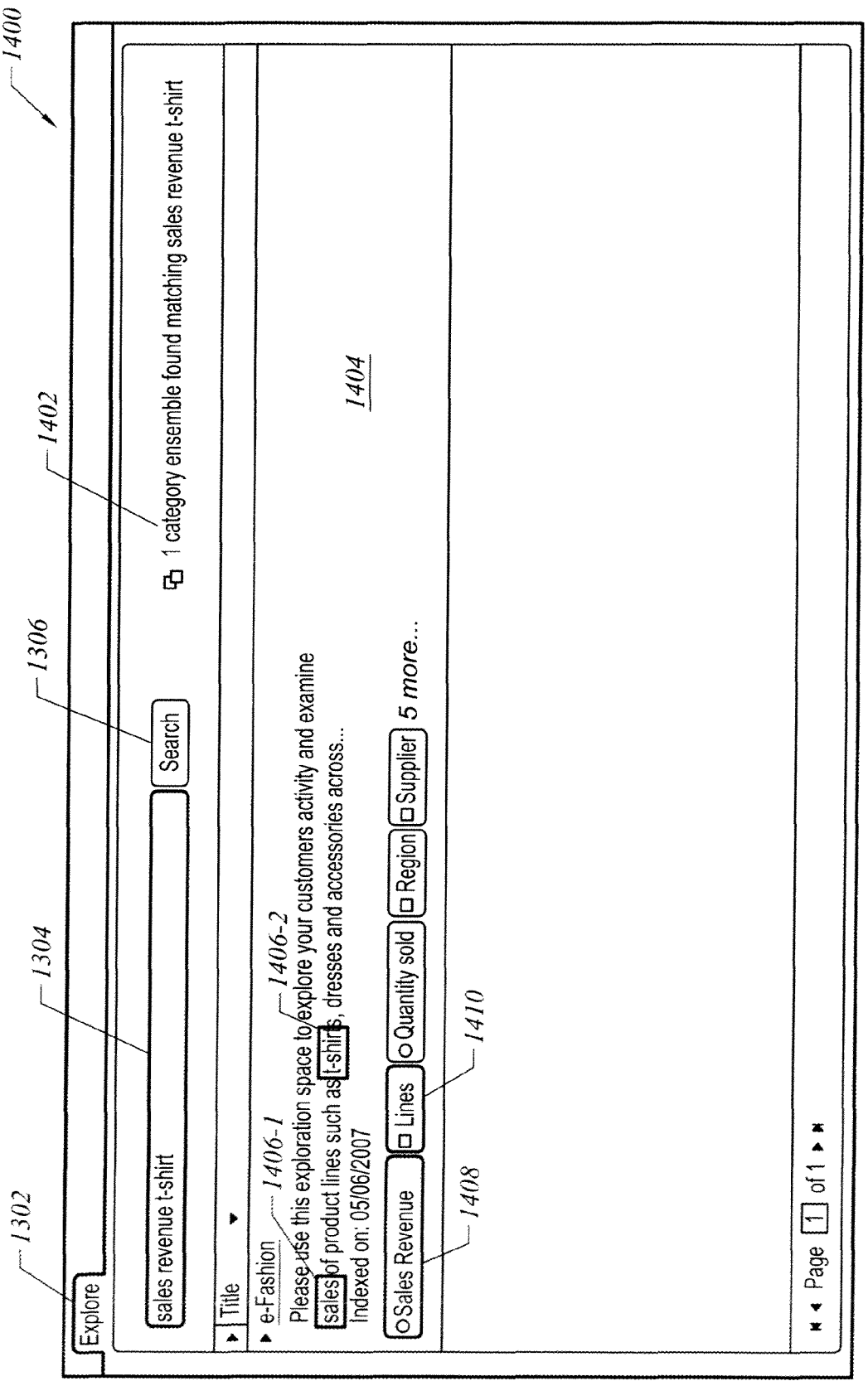
FIG. 14 illustrates the GUI of FIG. 13 displaying the results of a search using the relevancy parameter in accordance with a specific embodiment of the invention.

FIG. 14 illustrates a GUI 1400 displaying the results of relevancy parameters. Only one category ensemble remains.

This in indicated by message banner 1402. The singular category ensemble that matches the relevancy parameters is "e-Fashion" 1404. The relevant terms to the relevancy parameters are shown by highlighting, i.e., 1406, 1408 and 1410. These relevant terms in the description of the category ensemble 1404 are on "Sales" 1406-1 and "t-shirts" 1406-2. The selected measure is "Sales Revenue" 1408. The only relevant category is the "Lines" dimension 1410.

Figure 15:
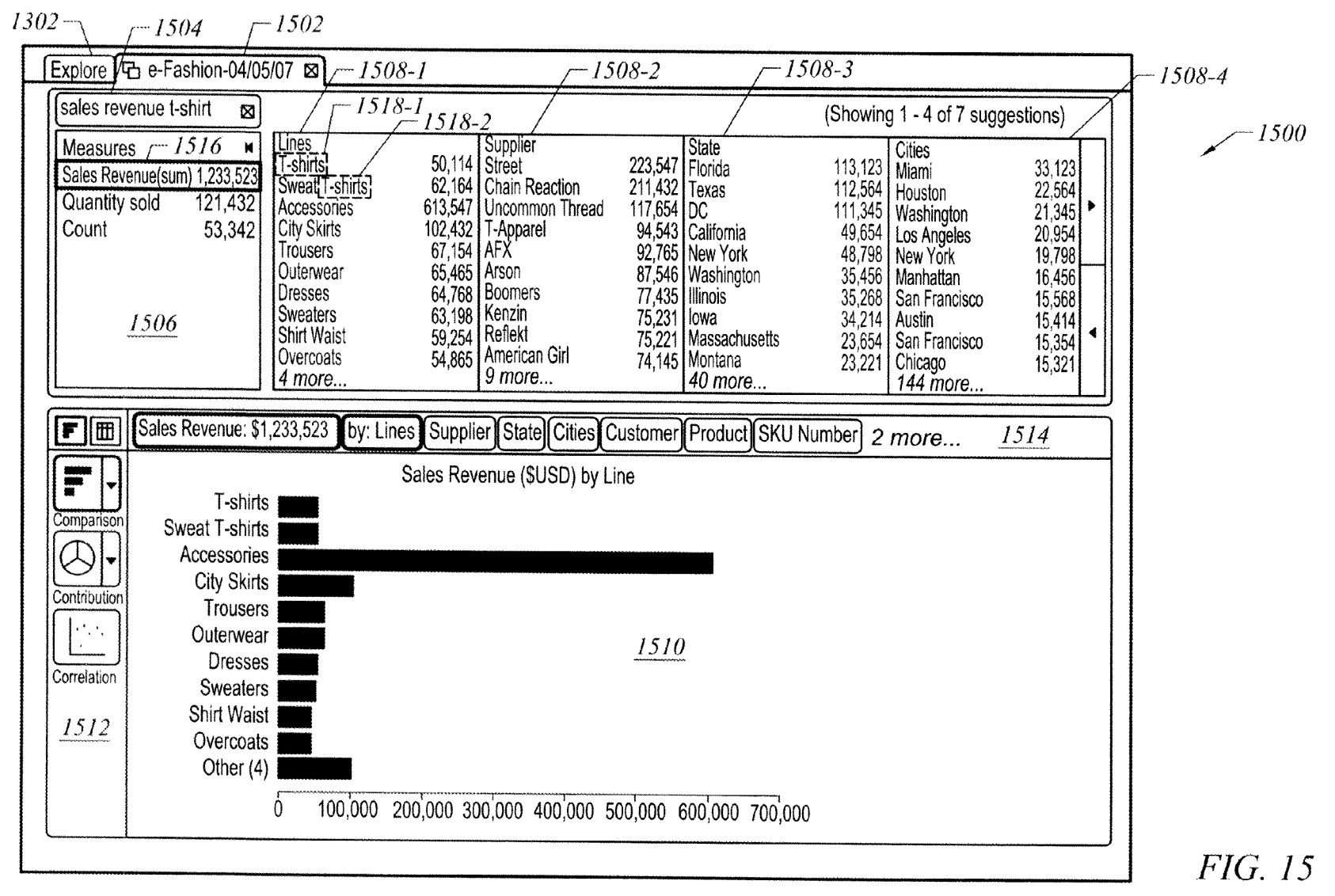

FIG. 15 illustrates a GUI 1500. The GUI 1500 displays an additional tab 1502 showing the relevancy parameters within box 1504. A measure panel 1506, a set of categories (1508-1 through 1508-4) and a visualization for the dataset 1510 are shown. The visualization can be automatically selected according to any number of techniques including those described in the following previously filed, commonly owned patent application, which is incorporated by reference herein in its entirety: "Apparatus and Method for Selecting Visualizations of Multidimensional Data", application Ser. No. 11/503,486, filed Aug. 10, 2006.

Also included in the analysis view tab 1502 is a set of icons 1512 representing and executing instructions to adjust the visualization 1510. A graphical listing 1514 of the measures and categories is displayed. The graphical listing 1514 summarizes the selected measures and categories. The selected measure "Sales Revenue (sum)" 1516 was preselected because it matched a term in the relevancy parameters. The highest ranked category is the "Lines" category 1508-1 which includes two relevant terms 1518-1 and 1518-2. The remaining categories 1508-2, 1508-3 and so on are ranked below the "Lines" category 1508-1. The sales revenue measure is highly relevant because the relevancy parameter "sales revenue" was supplied by the user.

Figure 16:
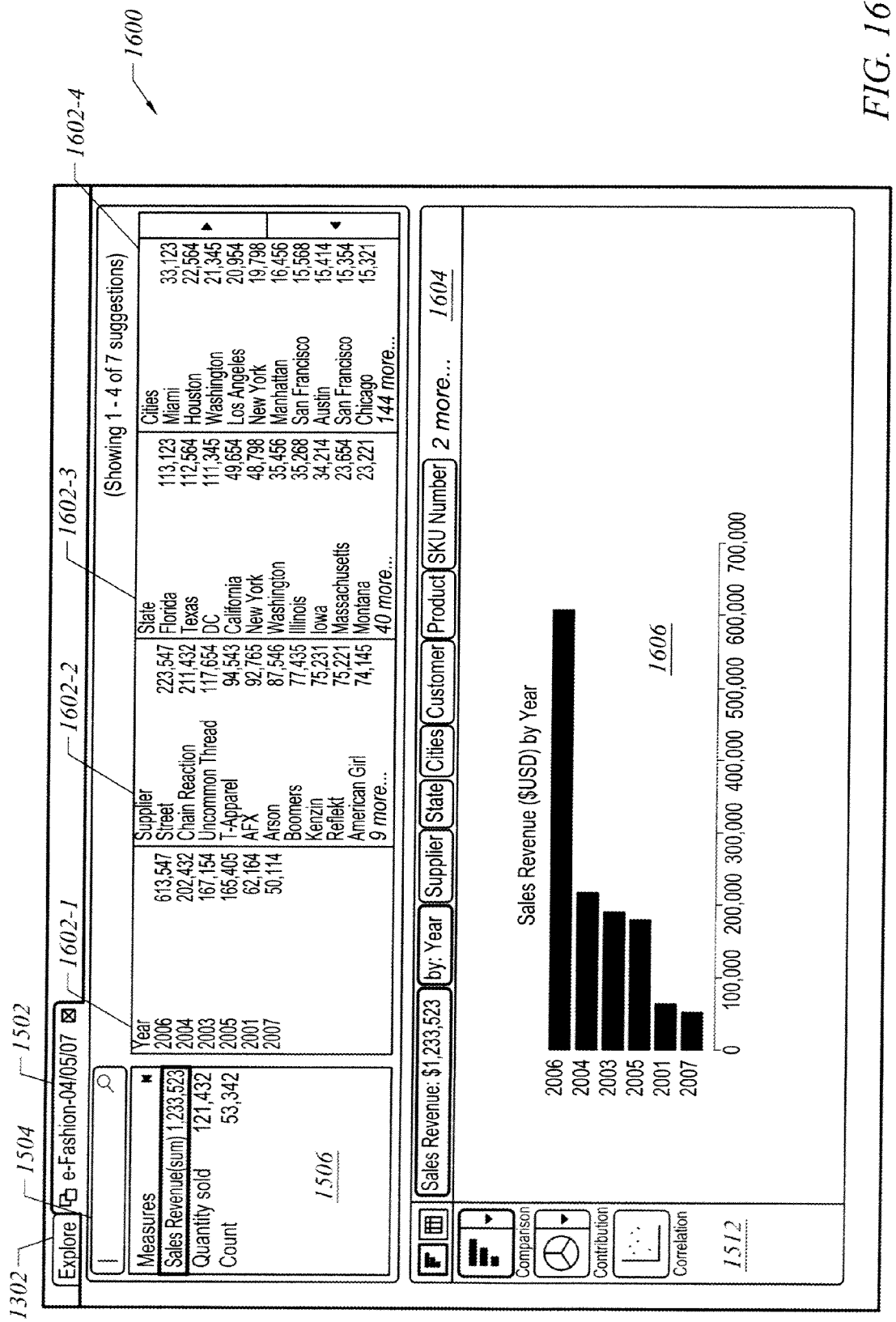
FIG. 16 illustrates the additional tab of FIG. 15 displaying an analysis view of a category ensemble with categories ordered by merit in accordance with an embodiment of the invention.

FIG. 16 illustrates the GUI 1600 displaying an analysis view with a set of categories arranged by merit. To cause the transition to GUI 1600 from GUI 1500, the user clicked on the cancel button in box 1504. The box 1504 no longer includes the relevancy parameter. There is now nothing to assess relevancy by and in particular the relevancy parameter "t-shirt" no longer influences the category ordering. The processing operation 1105 of FIG. 11 as invoked by operation set 1200 is applied. As shown in FIG. 16 the "Lines" category is no longer selected. The categories 1602-1, 1602-2, 1602-3 and 1602-4 are arranged by merit. In an embodiment, the previously selected measure remains. As shown in GUI 1600, the measure panel 1506 has a selected measure corresponding to a default measure. In an embodiment, the selected measure reverts to a previous relevancy parameter match. The selected measure and category are shown in a graphical listing 1604. A visualization 1606 included in GUI 1600 shows the revenue for the dataset by year. The category "Year" had the highest merit of the categories and the user selected it to create visualization 1606. An alternative workflow for arriving at GUI 1600 includes the client requesting an alternative ordering of categories.

The above detailed description shows a technique to start an analysis workflow stemming from a relevancy search based on a relevancy parameter. This workflow allows a user to select a category ensemble of interest. The category ensemble presented in an analysis view includes preselected categories and measures that are relevant to the provided relevancy parameter. This provides the user with a place to start an analysis of the dataset underlying the category ensemble. The above detailed description also describes techniques to order a set of unselected categories shown in the analysis view within a GUI. The order of the set of unselected categories reflects the relevancy of each unselected category to the relevancy parameter, each category's merit to partition the dataset and the like. These unselected categories may be selected via the user's interaction with the GUI and are applied in the user's analysis. The analysis view can include preselected measures and breakdown dimensions/categories to aid the user in analyzing the dataset. The user's analysis can follow workflows supported by the techniques shown in FIGS. 1-7 and the associated detailed description.

Herein, when introducing elements of embodiments of the invention the articles "a", "an", "the" and "said" are intended to mean that there are one or more of the elements. The terms "comprising", "including" and "having" are intended to be inclusive and to mean that there may be additional elements other than the listed elements.

An embodiment of the present invention relates to a computer storage product with a computer-readable medium having computer code thereon for performing various computer-implemented operations. The media and computer code may be those specially designed and constructed for the purposes of the present invention, or they may be of the kind well known and available to those having skill in the computer software arts. Examples of computer-readable media include, but are not limited to: magnetic media such as hard disks, floppy disks, and magnetic tape; optical media such as CD-ROMs, DVDs and holographic devices; magneto-optical media; and hardware devices that are specially configured to store and execute program code, such as application-specific integrated circuits ("ASICs"), programmable logic devices ("PLDs") and ROM and RAM devices. Examples of computer code include machine code, such as produced by a compiler, and files containing higher-level code that are executed by a computer using an interpreter. For example, an embodiment of the invention may be implemented using Java, C++, or other object-oriented programming language and development tools. Another embodiment of the invention may be implemented in hardwired circuitry in place of, or in combination with, machine-executable software instructions.

The foregoing description, for purposes of explanation, used specific nomenclature to provide a thorough understanding of the invention. However, it will be apparent to one skilled in the art that specific details are not required in order to practice the invention. Thus, the foregoing descriptions of specific embodiments of the invention are presented for purposes of illustration and description. They are not intended to be exhaustive or to limit the invention to the precise forms disclosed; obviously, many modifications and variations are possible in view of the above teachings. The embodiments were chosen and described in order to best explain the principles of the invention and its practical applications, they thereby enable others skilled in the art to best utilize the invention and various embodiments with various modifications as are suited to the particular use contemplated. It is intended that the following claims and their equivalents define the scope of the invention.

The invention claimed is:

1. A computer readable storage medium, comprising executable instructions to:
   receive a selection of a category ensemble overlying a dataset;
   define an analysis view of the category ensemble, wherein the analysis view comprises:
      a set of categories divided into:
         a first subset of unselected categories, and
         a second subset of selected categories,
      a set of measures, and
      a visualization for a subset of the dataset, including a preselected measure that is a highly relevant measure in the category ensemble, wherein the preselected measure is a codomain of the visualization;
receive a relevancy parameter;
conduct a search based on the relevancy parameter in the category ensemble;
create a first order of the first subset of unselected categories based on relevancy, wherein the first order based on the relevancy is based on relevancy of the relevancy parameter to each category in the set of categories;
create a second order of the first subset of unselected categories based on merit, wherein merit is a value which indicates efficiency for partitioning the dataset;
combine the first order and the second order into a final order for the first subset of unselected categories of the set of categories; and
update the analysis view by displaying the first subset of unselected categories in the final order.

2. The computer readable storage medium of claim 1 further comprising executable instructions to:
conduct a search based on the relevancy parameter over a plurality of category ensembles; and
order the plurality of category ensembles by relevancy.

3. The computer readable storage medium of claim 1 wherein a high value for merit is taken from the combination of two or more values selected from high entropy, high coverage and low cardinality.

4. The computer readable storage medium of claim 1, wherein relevancy is based on at least one of keyword, usage metrics, data source information, data quality level, data lineage metadata, favorite information, data design information and data metadata.

5. The computer readable storage medium of claim 4 wherein relevancy based on keyword is selected from the group comprising equality of keyword to name, similarity of keyword to name, equality of keyword to metadata, and similarity of keyword to metadata.

6. The computer readable storage medium of claim 1 further comprising executable instructions to:
accept the selection of an attribute in a category in the set of categories, wherein the category includes a set of attributes; and
filter the dataset using the attribute as a filter value.

7. The computer readable storage medium of claim 6 further comprising executable instructions to display the second subset of selected categories in a third order, wherein the third order reflects the sequence in which the categories in the second subset of selected categories were selected.

8. The computer readable storage medium of claim 6 further comprising executable instructions to determine another final order for the first subset of unselected categories.

9. The computer readable storage medium of claim 1 further comprising executable instructions to:
select a highly relevant category in the category ensemble; and
return the category as a preselected domain in a visualization.

10. The computer readable storage medium of claim 1 wherein the final order is selected from the group comprising:
heterogeneous in terms of the first order and the second order of the first subset of unselected categories, and
homogenous in terms of the first order and the second order of the first subset of unselected categories.

11. The computer readable storage medium of claim 1 further comprising executable instructions to:
accept the selection of a category in the set of categories; and
update the analysis view to include the category as a breakdown category.

12. The computer readable storage medium of claim 1 further comprising executable instructions to:
display the analysis view in a graphical user interface, wherein:
the first subset of unselected categories is made available for selection,
the second subset of selected categories is made available for unselection,
the set of measures is made available for selection or unselection,
a selection change includes selection and unselection, and
receive a representative selection change created by a user's interaction with the graphical user interface; and
refresh the analysis view based on the representative selection change.

13. The computer readable storage medium of claim 1, wherein:
each of the set of measures, the set of categories and the category ensemble is associated with two or more pieces of metadata selected from: name, multilingual name, description, user tags, user comments, usage metrics, data source information, data quality level, data lineage information, favorite information, data design information and data information.

* * * * *